(12) United States Patent
Nakao et al.

(10) Patent No.: US 8,054,739 B2
(45) Date of Patent: Nov. 8, 2011

(54) METHOD AND APPARATUS FOR TRANSMITTING SIGNALS, AND METHOD AND APPARATUS FOR RECEIVING THE SIGNALS

(75) Inventors: Seigo Nakao, Gifu (JP); Yasuhiro Tanaka, Aichi (JP); Nobuo Higashida, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 558 days.

(21) Appl. No.: 11/167,577

(22) Filed: Jun. 28, 2005

(65) Prior Publication Data

US 2005/0286562 A1 Dec. 29, 2005

(30) Foreign Application Priority Data

Jun. 28, 2004 (JP) ................................ 2004-189303
Jun. 21, 2005 (JP) ................................ 2005-180550

(51) Int. Cl.
*H04J 3/16* (2006.01)
*H04J 11/00* (2006.01)
*H04L 12/413* (2006.01)
*H04W 4/00* (2009.01)

(52) U.S. Cl. ........................ 370/203; 370/338

(58) Field of Classification Search .................. 370/466, 370/203, 208, 338, 349; 455/445; 375/345, 375/267, 299

See application file for complete search history.

(56) References Cited

U.S. PATENT DOCUMENTS

| | | | |
|---|---|---|---|
| 6,549,777 B1 | 4/2003 | Neumann et al. | |
| 6,553,021 B1 | 4/2003 | Bishop et al. | |
| 7,039,412 B2 * | 5/2006 | Sandhu et al. | 455/445 |
| 7,233,773 B2 | 6/2007 | Hansen et al. | |
| 7,586,881 B2 * | 9/2009 | Hansen et al. | 370/334 |
| 2002/0147953 A1 | 10/2002 | Catreux et al. | |
| 2002/0160737 A1 * | 10/2002 | Crawford | 455/272 |
| 2002/0167962 A1 * | 11/2002 | Kowalski | 370/445 |
| 2003/0003880 A1 | 1/2003 | Ling et al. | |
| 2005/0152314 A1 | 7/2005 | Sun et al. | |
| 2005/0213554 A1 * | 9/2005 | Ginzburg et al. | 370/349 |

(Continued)

FOREIGN PATENT DOCUMENTS

EP 0 944 199 A1 9/1999

(Continued)

OTHER PUBLICATIONS

English Translation of the Written Opinion of the International Searching Authority issued in corresponding Japanese Patent Application No. PCT/JP2005/011562, filed on Jun. 23, 2005.

(Continued)

*Primary Examiner* — Derrick Ferris
*Assistant Examiner* — Angel Brockman
(74) *Attorney, Agent, or Firm* — McDermott Will & Emery LLP

(57) ABSTRACT

A storage unit stores a preamble signal defined in a legacy system and a preamble signal defined in a MIMO system. A monitoring unit in a transmitting apparatus monitors the existence of any communication apparatus which is not compatible with the MIMO system but accepts the legacy system. A channel characteristics acquiring unit derives the characteristics of a radio channel between the transmitting apparatus and a receiving apparatus. A selector selects a packet format based on a monitoring result obtained by the monitoring unit. The selector also selects where to place LTS, based on the characteristics of wireless channel derived by the channel characteristics acquiring unit.

14 Claims, 17 Drawing Sheets

| STS 1 | LTS 1 | SIGNAL | DATA 1 |
|---|---|---|---|
| STS a | LTS a | SIGNAL | DATA 2 |

U.S. PATENT DOCUMENTS

| | | | |
|---|---|---|---|
| 2005/0226270 A1* | 10/2005 | Liu et al. | 370/469 |
| 2005/0233709 A1* | 10/2005 | Gardner et al. | 455/101 |
| 2005/0239455 A1* | 10/2005 | Stephens | 455/426.2 |
| 2005/0286562 A1 | 12/2005 | Nakao et al. | |
| 2008/0192869 A1* | 8/2008 | Goel et al. | 375/345 |

FOREIGN PATENT DOCUMENTS

| | | |
|---|---|---|
| JP | 10-210099 | 8/1998 |
| JP | 2001-053714 | 2/2001 |
| JP | 2001-518765 | 10/2001 |
| JP | 2003-060649 | 2/2003 |
| JP | 2003-318853 A | 11/2003 |
| WO | WO 94/00952 | 1/1994 |
| WO | WO 99/17563 | 4/1999 |
| WO | WO 02/13448 A2 | 2/2002 |
| WO | WO 03/075469 A2 | 9/2003 |

OTHER PUBLICATIONS

Korean Office Action, with English Translation, issued in KR 10-2007-7002023 dated on Apr. 15, 2008.

Auer. "Analysis of Pilot-Symbol Aided Channel Estimation for OFDM System with Multiple Transmit Antennas." IEEE International Conference, Jun. 24, 2004, IEEE Communications Society, vol. 6, pp. 221-3225.

Russian Office Action, with English Translation, issued in Russian Patent Application No. 2007103189/09(003426), dated Mar. 24, 2009.

Indonesian Office Action, w/ English translation thereof, issued in Indonesian Patent Application No. W-002006 03744 dated Jan. 28, 2009.

Chinese Office Action, w/ English translation thereof, issued in Chinese Patent Application No. CN 2005800218250 dated Oct. 16, 2009.

Japanese Notification of Reasons for Refusal, with English Translation, issued in Japanese Patent Application No. JP 2006-117471, dated Jul. 14, 2009.

Japanese Notification of Reasons for Refusal, with English Translation, issued in Japanese Patent Application No. JP 2005-180551, dated Jul. 14, 2009.

Japanese Notification of Reasons for Refusal, with English Translation, issued in Japanese Patent Application No. JP 2006-117472, dated Jul. 14, 2009.

Jan Boer et al., Backwards compatibility, IEEE 802.11-03/714r0, Sep. 2003.

Armin Dammann et al., Beamforming in Combination with Space-Time Diversity for Broadband OFDM Systems, 2002 IEEE International Conference on Communications, United States, Apr. 28, 2002.

Seigo Nakao et al., Considerations for STS MIMO-OFDM, IEEE802.11-04/002r0, Jan. 12, 2004 <http://www.ieee802.org/11/DocFiles/04/11-04-0002-02-000n-considerations-sts-mimo-ofdm.ppt>.

Japanese Notification of Reason(s) for Refusal, w/English translation thereof, issued in Japanese Patent Application No. JP 2005-180550 dated Jul. 21, 2009.

J. Liu et al., "A MIMO System with Backward Compatibility for OFDM-Based WLANs," Signal Processing Advances in Wireless Communications, 2003 (SPAWC 2003) 4th IEEE Workshop (Jun. 18, 2003) pp. 130-134.

S. Nakao et al., "Effective (20us) Preambles of MIMO-OFDM," (IEEE802.11-04/249r3, May 11, 2004).

T. Aoki et al., "New preamble structure for AGC in a MIMO-OFDM system," IEEE802.11-04/046r1, Jan. 2004.

Vietnamese Office Action issued in Vietnamese Patent Application No. 1-2007-00189 dated Sep. 24, 2009.

Written Opinion of the International Searching Authority for the corresponding Patent Application No. PCT/JP2005/011563, mailed Aug. 16, 2005.

United States Notice of Allowance issued in U.S. Appl. No. 11/167,585 dated Jan. 8, 2010.

United States Office Action issued in U.S. Appl. No. 11/167,585, dated May 11, 2010.

Japanese Office Action, with English translation, issued in Japanese Patent Application No. 2006-117471, mailed Aug. 3, 2010.

Japanese Office Action, with English translation, issued in Japanese Patent Application No. 2009-210057, mailed Aug. 3, 2010.

Japanese Notification of Reason(s) for Refusal, w/ English translation thereof, issued in Japanese Patent Application No. JP 2006-117471 dated Apr. 13, 2010.

Japanese Notification of Reason(s) for Refusal, w/ English translation thereof, issued in Japanese Patent Application No. JP 2009-210057 dated May 11, 2010.

Japanese Notification of Reason(s) for Refusal, w/ English translation thereof, issued in Japanese Patent Application No. JP 2006-117472 dated Apr. 13, 2010.

Japanese Notification of Reason(s) for Refusal, w/ English translation thereof, issued in Japanese Patent Application No. JP 2005-180551 dated Apr. 13, 2010.

S. Komaki, "Wireless LAN and Ubiquitous Network," Maruzen Co., Ltd., Jan. 30, 2004, pp. 105-107.

E. Costa et al., "A Simple Space-Frequency Coding Scheme with Cyclic Delay Diversity for OFDM," Personal Mobile Communications Conference, 2003, (IEEE, Apr. 25, 2003), pp. 106-110.

M. Wentink et al., "802.11g MAC Analysis and Recommendations," IEEE 802.11-02/065r1, (IEEE Jan. 2002), Slides 1 and 31-35.

Chinese Office Action, w/ English translation thereof, issued in Chinese Patent Application No. CN 200580021534.1 dated Dec. 11, 2009.

H. Matsue et al., "802.11 High-speed Wireless LAN Textbook," (IDG Japan, Inc., Mar. 29, 2003), pp. 34-39, w/ English translation thereof.

H. Zhang et al., "A New Space-Yime-Frequency MIMO-OFDM Scheme with Cyclic Delay Diversity," Proceedings of the IEEE 6th Circuits and Systems Symposium on Emerging Technologies: Frontiers of Mobile and Wireless Communications, (May 31, 2004), vol. 2, pp. 647-650.

Japanese Notification of Reason(s) for Refusal, w/ English translation thereof, issued in Japanese Patent Application No. JP 2005-180550 dated Oct. 19, 2010.

United States Office Action issued in U.S. Appl. No. 12/761,139 dated Nov. 23, 2010.

Japanese Decision of Refusal, w/English translation thereof, issued in Japanese Patent Application No. JP 2005-180550 dated Mar. 8, 2011.

United States Notice of Allowance issued in U.S. Appl. No. 11/167,585 dated May 23, 2011.

European Search Report issued in European Patent Application No. EP 05753339.0 dated Apr. 20, 2011.

European Search Report issued in European Patent Application No. EP 05753340.8 dated Apr. 20, 2011.

US Office Action issued in U.S. Appl. No. 12/761,139, dated Aug. 18, 2011.

* cited by examiner

FIG.8

|  | 1ST TRANSMITTING ANTENNA 14a | 2ND TRANSMITTING ANTENNA 14b | 3RD TRANSMITTING ANTENNA 14c |
|---|---|---|---|
| THE NUMBER OF ANTENNAS:1 | LEGACY STS OR STS 1 | — | — |
| THE NUMBER OF ANTENNAS:2 | STS 1 | STS a | — |
| THE NUMBER OF ANTENNAS:3 | STS 1 | STS 2 | STS b |

FIG.15A

| LEGACY STS | LEGACY LTS | SIGNAL | STS1 | LTS1 | SIGNAL | DATA 1 |
|---|---|---|---|---|---|---|
| LEGACY STS +CDD | LEGACY LTS +CDD | SIGNAL +CDD | STSa | LTSa | SIGNAL | DATA 2 |

FIG.15B

| STS1 | LTS1 | SIGNAL | DATA 1 |
|---|---|---|---|
| STSa | LTSa | SIGNAL | DATA 2 |

FIG.15C

| LEGACY STS | LTS1 | SIGNAL | DATA 1 |
|---|---|---|---|
| LEGACY STS +CDD | LTSa | SIGNAL | DATA 2 |

FIG.17A

| LEGACY STS | LEGACY LTS | SIGNAL | STS1' | LTS1' | SIGNAL1' | DATA 1' |
|---|---|---|---|---|---|---|
| LEGACY STS +CDD1 | LEGACY LTS +CDD1 | SIGNAL +CDD1 | STS2' | LTS2' | SIGNAL2' | DATA 2' |
| LEGACY STS +CDD2 | LEGACY LTS +CDD2 | SIGNAL +CDD2 | STS3' | LTS3' | SIGNAL3' | DATA 3' |
| LEGACY STS +CDD3 | LEGACY LTS +CDD3 | SIGNAL +CDD3 | STS4' | LTS4' | SIGNAL4' | DATA 4' |

FIG.17B

| STS1' | LTS1' | SIGNAL1' | DATA 1' |
|---|---|---|---|
| STS2' | LTS2' | SIGNAL2' | DATA 2' |
| STS3' | LTS3' | SIGNAL3' | DATA 3' |
| STS4' | LTS4' | SIGNAL4' | DATA 4' |

FIG.17C

| LEGACY STS | LTS1' | SIGNAL1' | DATA 1' |
|---|---|---|---|
| LEGACY STS +CDD1 | LTS2' | SIGNAL2' | DATA 2' |
| LEGACY STS +CDD2 | LTS3' | SIGNAL3' | DATA 3' |
| LEGACY STS +CDD3 | LTS4' | SIGNAL4' | DATA 4' |

METHOD AND APPARATUS FOR TRANSMITTING SIGNALS, AND METHOD AND APPARATUS FOR RECEIVING THE SIGNALS

BACKGROUND OF THE INVENTION

1. Field of the Invention

The present invention relates to the signal transmitting and receiving technologies, and it particularly relates to method and apparatus for transmitting signals in the packet format and method and apparatus for receiving the signals in the packet format.

2. Description of the Related Art

In wireless communication, it is generally desired that the limited frequency resources be used effectively. Adaptive array antenna technology is one of the technologies that realize the effective utilization of frequency resources. In adaptive array antenna technology, the amplitude and phase of signals transmitted from and received by a plurality of antennas, respectively, are so controlled as to form a directional pattern of the antenna. In other words, the apparatuses provided with adaptive array antennas change respectively the amplitudes and phases of signals received by a plurality of antennas, add up the thus changed received signals, and receive signals equivalent to the signals received by the antenna having the directional pattern corresponding to the variation in said amplitude and phase (hereinafter referred to as "weight"). And the signals are transmitted in a directional pattern of the antenna corresponding to the weight.

One example of processings to compute the weights in adaptive array antenna technology is a processing based on the MMSE (Minimum Mean Square Error) method. In the MMSE method, the Wiener solution is known to be the condition for an optimum weight value. Also known is a recurrence formula whose amount of calculation is smaller than that required to directly solve the Wiener solution. For such recurrence formula, adaptive algorithms, such as RLS (Recursive Least Squares) algorithm and LMS (Least Mean Squares) algorithm, are used. On the other hand, for the purpose of realizing a higher data transmission rate and improving the transmission quality, there is a case where data are subjected to multi-carrier modulation and the multi-carrier signals are transmitted (See Reference (1) in the following Related Art List, for instance).

2. Related Art List (1) Japanese Patent Application Laid-Open No. Hei10-210099.

There is a MIMO (Multiple Input Multiple Output) system as one of technologies by which to raise the transmission rate of data using the adaptive array antenna technology. A transmitting apparatus and a receiving apparatus in the MIMO system are each equipped with a plurality of antennas, and a channel suitable for each of the antennas is set. That is, the channel of up to the maximum number of antennas is set for the communication between the transmitting apparatus and the receiving apparatus, so as to improve the data transmission rate. Moreover, combining the MIMO system with a technique of transmitting multi-carrier signals results in a higher data transmission rate. On the other hand, the transmitted signals generally contain preambles that are known signals in order for the signals transmitted from the transmitting apparatus to be accurately received. In general, a preamble signal is specified by a fixed pattern. Nevertheless, if the pattern of a preamble signal varies taking into account the characteristics of radio channel and the packet utilization efficiency, it is possible to realize a wireless communication system which is flexible in terms of the characteristics of radio channel and the like.

SUMMARY OF THE INVENTION

The present invention has been made in view of the foregoing circumstances and problems, and an object thereof is to provide method and apparatus by which to vary the format of preamble signal.

In order to solve the above problems, a transmitting apparatus according to a preferred mode of carrying out the a generation unit which generates a packet signal using either a first packet format or a second packet format defined in a manner such that part of the first packet format is extracted, wherein the first packet format is such that a second known signal in a second wireless communication system differing from a first wireless communication system is placed subsequent to a first known signal in the first wireless communication system; and a transmitter which transmits the packet signal generated by the generation unit.

According to this mode of carrying out the present invention, the use of packet format is switched between a predetermined packet format and another packet format defined in a manner that part of packet format is extracted, so that the compatibility with the first wireless communication system or the improvement in the packet utilization efficiency can be realized.

The part extracted from the first packet format defined in the generation unit may contain at least part, of the second known signal, which is to be used to estimate a channel. In this case, even if the another packet format defined in a manner such that part of packet format is extracted is used, the packet signal can be received by a radio apparatus compatible with the second wireless communication system.

The first known signal contained in a packet format defined in the generation unit may be defined in such a manner as to have mutual relations among a plurality of antennas, respectively and the second known signal may be defined in such a manner as to be associated respectively to the plurality of antennas. In this case, even if the first known signal is transmitted from a plurality of antennas, the first known signal can be received by a radio apparatus compatible with the first wireless communication system.

The first known signal contained in a packet format defined in the generation unit may be defined in such a manner as to have mutual relations among a plurality of series, respectively and the second known signal may be defined in such a manner as to be associated respectively to the plurality of series. In this case, even if the first known signal is transmitted as a plurality of series, the first known signal can be received by a radio apparatus compatible with the first wireless communication system.

Still another preferred mode of carrying out the present invention relates to a transmitting method. This method is such that that a first packet format is such that a second known signal in a second wireless communication system differing from a first wireless communication system is placed subsequent to the first known signal in the first wireless communication system, and a packet signal is generated using either a first packet format or a second packet format defined in a manner such that part of the first packet format is extracted.

Still another preferred mode of carrying out the present invention relates also to a transmitting method. This method is comprised: generating a packet signal using either a first packet format or a second packet format defined in a manner such that part of the first packet format is extracted, wherein the first packet format is such that a second known signal in a second wireless communication system differing from a first wireless communication system is placed subsequent to a first known signal in the first wireless communication system; and transmitting the generated packet signal.

The part extracted from the first packet format defined in the generating may contain at least part, of the second known signal, which is to be used to estimate a channel. The first wireless communication system and the second wireless communication system corresponding to a packet format defined in the generating may use multi-carrier signals. The first known signal contained in a packet format defined in the generating may be defined in such a manner as to have mutual relations among a plurality of antennas, respectively and the second known signal may be defined in such a manner as to be associated respectively to the plurality of antennas.

The first known signal contained in a packet format defined in the generating may be defined in such a manner as to have mutual relations among a plurality of series, respectively and the second known signal may be defined in such a manner as to be associated respectively to the plurality of series. The transmitting method may further comprise monitoring the presence of a communication apparatus which is not compatible with the second wireless communication system and is compatible with the first wireless communication system, wherein the generating may generate the packet signal while selecting either the first packet format or the second format based on a monitoring result obtained from the monitoring.

Still another preferred mode of carrying out the present invention relates to a receiving apparatus. This apparatus comprises: a receiver which receives a packet signal from a transmitting apparatus in which a first packet format is such that a second known signal in a second wireless communication system differing from a first wireless communication system is placed subsequent to the first known signal in the first wireless communication system and either the first packet format or a second packet format defined in a manner such that part of the first packet format is extracted is used; an estimation unit which estimates characteristics of channel based on part, of the second known signal in the packet signal received by the receiver, which is to be used to estimate a channel; and a processing unit which processes data contained in the packet signal, based on the characteristics of channel estimated by the estimation unit.

According to this mode of carrying out the present invention, even if the packet signal to be received is compatible with a plurality of kinds of packet formats, such the packet signal can be received.

The receiving apparatus may further comprise a specifying unit which stores beforehand a relation, for a packet signal to be received by the receiver, between a signal pattern contained in a first packet format and that contained in a second packet format and which specifies a packet format for the packet signal received by the receiver based on the relation, wherein the estimation unit and the processing unit may perform a processing based on the packet format specified by the specifying unit. In this case, from a received packet signal, the packet format for said packet signal is automatically specified, so that a sequence with which to notify the kind of packet can be omitted.

Still another preferred mode of carrying out the present invention relates to a receiving method. This is a method of receiving a packet signal from a transmitting apparatus in which a first packet format is such that a second known signal in a second wireless communication system differing from a first wireless communication system is placed subsequent to the first known signal in the first wireless communication system and either the first packet format or a second packet format defined in a manner such that part of the first packet format is extracted is used, and the method is characterized in that characteristics of channel is estimated based on part, of the second known signal in the received packet signal, which is to be used to estimate a channel and data contained in the packet signal is processed based on the estimated characteristics of channel.

Still another preferred mode of carrying out the present invention relates also to a transmitting apparatus. This apparatus comprises: a storage unit which stores a first known signal defined in a first wireless communication system and a second known signal defined in a second wireless communication system which differs from the first wireless communication system; a selector which selects either a first packet format in which the second known signal is placed in a front portion thereof or a second packet format in which the first known signal is further placed before the second known signal; and a transmitter which transmits signals in the packet format selected by the selector.

According to this mode of carrying out the present invention, the presence or absence of the first preamble signal is switched, so that the improvement in the compatibility with the first wireless communication system and the packet utilization efficiency in the second wireless communication system can be selected.

Still another preferred mode of carrying out the present invention relates also to a transmitting apparatus. This apparatus comprises: a storage unit which stores a first known signal defined in a first wireless communication system which is to transmit signals using a plurality of carriers and a second known signal defined in a second wireless communication system which is to transmit signals from a plurality of antennas in parallel, using the same number of carriers to transmit the signals as in the first wireless communication system; a selector which selects either a first packet format in which the second known signal is placed in a front portion thereof, or a second packet format in which the first known signal is further placed before the second known signal; and a transmitter which transmits signals in the packet format selected by the selector.

According to this mode of carrying out the present invention, the presence or absence of the first preamble signal is switched, so that the improvement in the compatibility with the first wireless communication system and the packet utilization efficiency in the second wireless communication system can be selected.

The second known signal stored in the storage unit may be defined in a plurality of kinds in accordance with the number of antennas which are to transmit signals in the second wireless communication system. Since the pattern of the second known signal is changed in accordance with the number of antennas, the communication quality can be improved.

If the packet format in which the second known signal is placed in a front portion thereof is selected and the number of antennas to transmit signals is one, the selector may assign one of the second known signals in which the plurality of kinds are defined. Even if the number of antennas becomes one from a plural number, the second known signal corresponding to one of a plurality of antennas is used. Thus, the switching to the first wireless communication system is no longer necessary.

When the second packet format in which the first known signal is further placed before the second known signal is selected, the selector may assign information indicating that the second known signal is placed, between the first known signal and the second known signal. Since the information indicating that the second known signal has been placed after the first known signal is inserted, the content of such a subsequent signal can be conveyed to a communication apparatus of the first wireless communication system.

The transmitting apparatus may further comprise a monitoring unit which monitors the presence of a communication apparatus which is not compatible with the second wireless communication system and is compatible with the first wireless communication system, wherein the selector may select a packet format based on a monitoring result obtained from the monitoring unit. The switching between the presence and the absence of the first known signal is done based on whether any terminal apparatus of the first wireless communication system exits or not. Hence, no adverse effect will be given on other communication apparatus even if the switching is carried out.

Still another preferred mode of carrying out the present invention relates also to a transmitting apparatus. This apparatus comprises: a transmitter which transmits signals defined in a predetermined packet format, in parallel from a plurality of antennas; storage unit which stores a known signal to be placed in a front portion of a packet format; and a selector which selects, at the time of placing a known signal in the front portion of a packet format, either a first assignment in which the known signal is transmitted at the same timing from the plurality of antennas or a second assignment in which the known signal is transmitted at different timings from the plurality of antennas.

According to this mode of carrying out the present invention, the assignment of a preamble signal to be transmitted from a plurality of antennas is varied. Thus, the transmission quality of signals and the packet utilization efficiency can be selected.

The transmitting apparatus may further comprise a derivation unit which derives characteristics of a radio channel through which signals are to be transmitted, wherein the selector may select the assignment of known signal based on the characteristics of a radio channel derived by the derivation unit. The structure of preamble signals to be transmitted from a plurality of antennas is varied based on the quality of a radio channel, so that the structure of a preamble suitable for the radio channel in use can be selected.

Still another preferred mode of carrying out the present invention relates also to a transmitting method. This method is characterized in that a first known signal defined in a first wireless communication system which is to transmit signals using a plurality carriers is specified, a second known signal defined in a second wireless communication system which is to transmit signals in parallel from a plurality of antennas using the same number of carriers as the number of carriers through which to transmit the signals are specified, and the signals are transmitted by selecting either a first packet format in which the second known signal is placed in a front portion or a second packet format in which the first known signal is further placed before the second known signal.

Still another preferred mode of carrying out the present invention relates also to a transmitting method. This method comprises: storing a first known signal defined in a first wireless communication system and a second known signal defined in a second wireless communication system which differs from the first wireless communication system; selecting either a first packet format in which the second known signal is placed in a front portion thereof or a second packet format in which the first known signal is further placed before the second known signal; and transmitting signals in the selected packet format.

Still another preferred mode of carrying out the present invention relates also to a transmitting method. This method comprises: storing a first known signal defined in a first wireless communication system which is to transmit signals using a plurality of carriers and a second known signal defined in a second wireless communication system which is to transmit signals from a plurality of antennas in parallel, using the same number of carriers to transmit the signals as in the first wireless communication system; selecting either a first packet format in which the second known signal is placed in a front portion thereof, or a second packet format in which the first known signal is further placed before the second known signal; and transmitting signals in the selected packet format.

The second known signal may be defined in a plurality of kinds in accordance with the number of antennas which are to transmit signals in the second wireless communication system. If the packet format in which the second known signal is placed in a front portion thereof is selected and the number of antennas to transmit signals is one, one of the second known signals in which the plurality of kinds are defined may be assigned. When the second packet format in which the first known signal is further placed before the second known signal is selected, information indicating that the second known signal is placed may be assigned, between the first known signal and the second known signal.

The transmitting method may further comprise monitoring the presence of a communication apparatus which is not compatible with the second wireless communication system and is compatible with the first wireless communication system, wherein the selecting may select a packet format based on a monitoring result obtained in the monitoring. The second signal stored in the storing may have a plurality of portions whose signal patterns differ from each other, and the selecting may select either a first assignment of the second known signal in which at least one of the plurality of portions are transmitted respectively at the same timing from a plurality of antennas or a second assignment of the second known signal in which at least one of the plurality of portions are transmitted respectively at different timings from the plurality of antennas. The method may further comprise deriving characteristics of a radio channel through which signals are to be transmitted, wherein the selecting may select the assignment of known signal based on the characteristics of a radio channel derived by the deriving.

Still another preferred mode of carrying out the present invention relates also to a transmitting method. This method is such that either a first assignment in which a known signal is transmitted at the same timing from a plurality of antennas or a second assignment in which the known signal is transmitted at different timings from the plurality of antennas is selected for the known signal to be placed in a front portion of a packet format of signal to be transmitted in parallel from the plurality of antennas.

Still another preferred mode of carrying out the present invention relates also to a transmitting method. This method comprises: transmitting signals defined in a predetermined packet format, in parallel from a plurality of antennas; storing a known signal to be placed in a front portion of a packet format; and selecting, at the time of placing a known signal in the front portion of a packet format, either a first assignment in which the known signal is transmitted at the same timing from the plurality of antennas or a second assignment in which the known signal is transmitted at different timings from the plurality of antennas. The method may further comprise deriving characteristics of a radio channel through which signals are to be transmitted, wherein the selecting may select the assignment of known signal based on the characteristics of a radio channel derived by the deriving.

It is to be noted that any arbitrary combination of the above-described structural components and expressions of the present invention changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 8 is a table showing a relationship, used when the selection is done at the selector shown in FIG. 5, between the number of transmitting antennas and the patterns of STSs transmitted by the transmitting antennas.

FIGS. 15A to 15C illustrate structures of packet format according to a modification of the present invention.

FIGS. 17A to 17C illustrate structures of packet format in signals transmitted from the transmitting apparatus shown in FIG. 16.

DETAILED DESCRIPTION OF THE INVENTION

Figure 1:
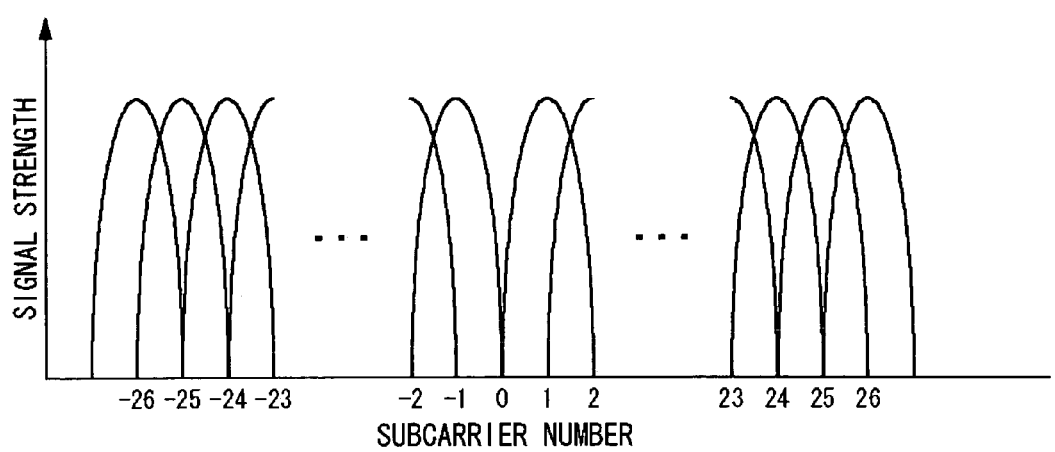
FIG. 1 illustrates a spectrum of a multi-carrier signal according to the present embodiment.

The invention will now be described based on the following embodiments which do not intend to limit the scope of the present invention but exemplify the invention. All of the features and the combinations thereof described in the embodiments are not necessarily essential to the invention.

Before describing the present invention in detail, an outline of the present invention will be described first. The present embodiment relates to a MIMO system which comprises a transmitting apparatus equipped with a plurality of antennas and a receiving apparatus equipped with a plurality of antennas. The MIMO system according to the present embodiment transmits signals by multi-carriers, or more specifically OFDM (Orthogonal Frequency Division Multiplexing) modulation scheme, and the transmitted signals are defined and specified in the packet format. A preamble signal is placed at a front portion of a packet format. And a receiving apparatus, which has received a signal, carries out the setting of AGC (Automatic Gain Control), the synchronization of timing, the recovery of carriers and the like, based on the preamble signal. In the MIMO system, independent signals are transmitted from a plurality of antennas of a transmitting apparatus and a receiving apparatus demodulates desired signals by separating received signals by adaptive array signal processing.

On the other hand, there are cases where in the vicinity of a transmitting apparatus there exists a receiving apparatus which is not compatible with a MIMO system (hereinafter, a system not compatible with a MIMO system will be referred to as "legacy system"). Although the legacy system transmits signals by the OFDM modulation scheme the same way as the MIMO system does, it differs from the MIMO system in that the signals are transmitted by setting one channel between the transmitting apparatus and the receiving apparatus. Now, if a preamble signal compatible with the MIMO system only is added, the signal redundancy in the packet format in the MIMO system can be reduced. However, since the legacy system cannot recognize such a preamble signal, there are cases where the arrival of signals cannot be recognized. In such a case, the carrier sense is not accurately executed if the legacy system uses CSMA (Carrier Sense Multiple Access). Since the legacy system judges, as a result, that the signals are not transmitted and, for that reason, mistakenly transmits the signals by itself, the rate of occurrence of signal collision increases.

In contrast thereto, if a preamble signal compatible with the legacy system is added before the preamble signal compatible with the MIMO system only, the legacy system can also recognize the preamble signal. As a result, the above-described problem is unlikely to be caused. Nevertheless, since the preambles compatible with both the two systems are added in this case, the signal redundancy in the packet format in the MIMO system increases. In order to solve this problem, a transmitting apparatus according to the present embodiment is such that a preamble signal compatible with a legacy system is added to the front portion of a packet format if a receiving apparatus compatible with the legacy system exists in the vicinity of the transmitting apparatus. On the other hand, the preamble signal compatible with the legacy system is not added to the front portion of a packet format if the receiving apparatus compatible with the legacy system does not exist in the vicinity of the transmitting apparatus. It is to be noted here that the "front portion" represents a part of leading portion, located near the head of a packet format, which also includes the head thereof.

FIG. 1 illustrates a spectrum of a multi-carrier signal according to the present embodiment. This corresponds to a multi-carrier signal transmitted from the legacy system and a multi-carrier signal transmitted from one of a plurality of antennas in the MIMO system. Here, assume that the legacy system is a wireless LAN (Local Area Network) conforming to the IEEE802.11a standard (hereinafter, a wireless LAN system in compliance with IEEE802.11a standard will be referred to as "legacy system", too). One of a plurality of carriers in an OFDM scheme is generally called a subcarrier. Herein, however, each of the subcarriers is designated by a "subcarrier number". As illustrated in FIG. 1, the IEEE802.11a standard defines 53 subcarriers, namely, subcarrier numbers "−26" to "26". It is to be noted that the subcarrier number "0" is set to null so as to reduce the effect of a direct current component in a baseband signal. Also, the respective subcarriers are modulated by BPSK (Binary Phase Shift Keying), QSPK (Quadrature Phase Shift Keying), 16 QAM (Quadrature Amplitude Modulation) and 64 QAM.

On the other hand, the subcarriers whose subcarrier numbers "−28" through "28" are used in the MIMO system. Thus, the number of subcarriers in use is "56", and the subcarrier number "0" is set to the null, as described above.

Figure 2:
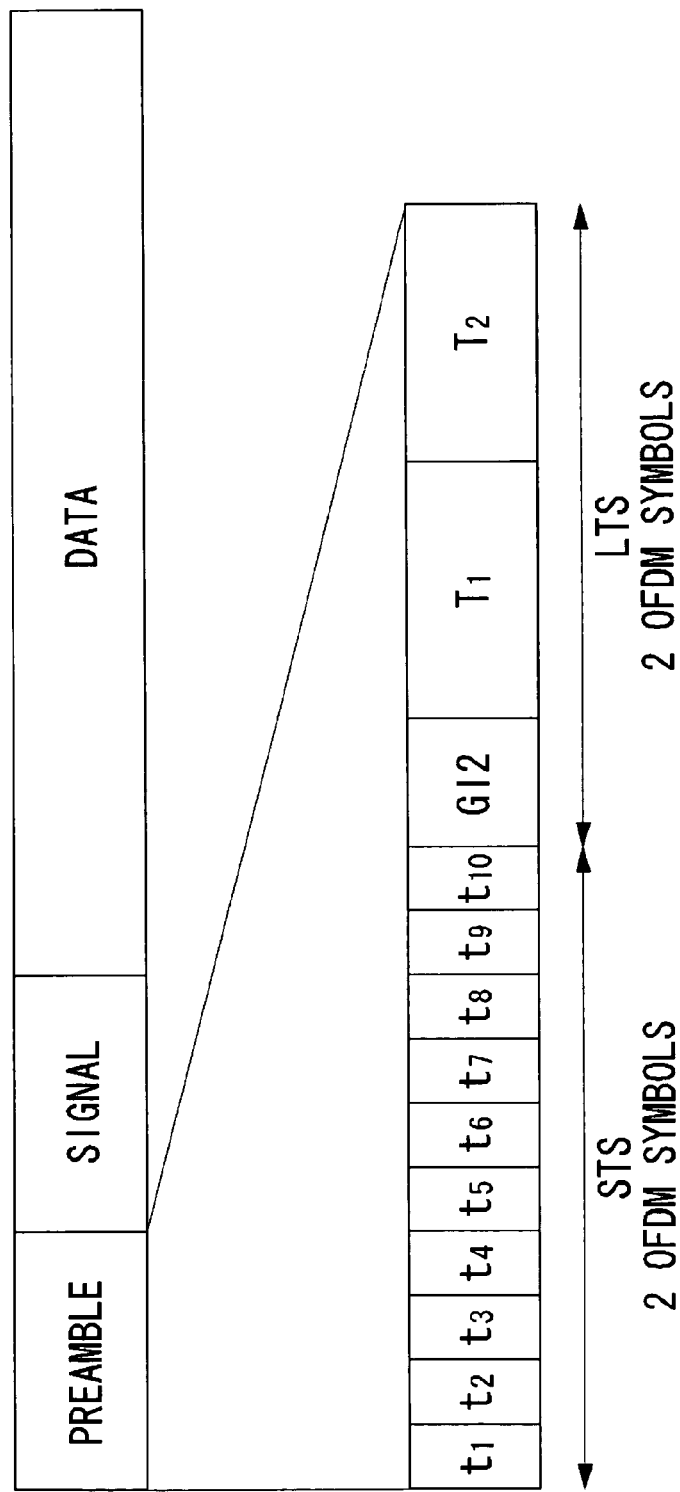
FIG. 2 illustrates a structure of a packet format according to the present embodiment.

FIG. 2 shows a structure of a packet format according to the present embodiment. This corresponds to a traffic channel of a legacy system. In the OFDM modulation scheme, the total sum of the size of Fourier transform and the number of symbols of a guard interval generally constitutes one unit. This "one unit" is called an OFDM symbol in the present embodiment. In the legacy system, the size of Fourier transform is 64 (hereinafter the points of one FFT (Fast Fourier Transform) will be called "FFT point") and the FFT point number of a guard interval is 16, so that the OFDM symbol corresponds to 80 FFT points.

A packet signal is such that a "preamble" composed of "4 OFDM symbols" is placed in the leading portion of the packet signal and a "signal" of "1 OFDM symbol" and "data" of arbitrary length in this order are placed subsequent to the "preamble". The "preamble" is a known signal used for the setting of AGC, timing synchronization and carrier recovery and the like in a receiving apparatus. The "signal" is a control signal whereas the "data" is information to be transmitted from a transmitting apparatus to a receiving apparatus. As shown in FIG. 2, the "preamble" composed of "4 OFDM symbols" are separated into "STS (Short Training Sequence)" composed of "2 OFDM symbols" and "LTS (Long Training Sequence)" composed of "2 OFDM symbols". STS is constituted by ten signal units "$t_1$" to "$t_{10}$" and each signal unit, such as "$t_1$", is equal to 16 FFT points. Though STS is 16 FFT points in time-domain unit as described above, it uses, in frequency domain, 12 subcarriers among 53 subcarriers as shown in FIG. 1. STS is used particularly for the setting of AGC and the timing synchronization. LTS, on the other hand, is constituted by two signal units "$T_1$" and "$T_2$" and a guard interval "GI2" which is twice as long as "$t_1$". And one signal unit such as "$T_1$" is 64 FFT points whereas "GI2" is 32 FFT points. LTS is used particularly for the carrier recovery.

A signal in the frequency domain as shown in FIG. 1 is expressed by $S_{-26, 26}$, where the subscript indicates the subcarrier number. Using such notation as this, STS of legacy system is expressed as in the following Equation (1).

$S_{-26, 26}$=sqrt(13/6){0,0,1+j,0,0,0,−1−j,0,0,0,1+j,0,0,
0,−1−j,0,0,0,−1−j,0,0,0,1+j,0,0,0,0,0,0,−1−j,0,0,
0,−1−j,0,0,0,1+j,0,0,0,1+j, 0,0,0,1+j,0,0,0,1+j,0,
0}  (1)

where "1+j" denotes the signal point of STS after a QPSK modulation.

Figure 3:
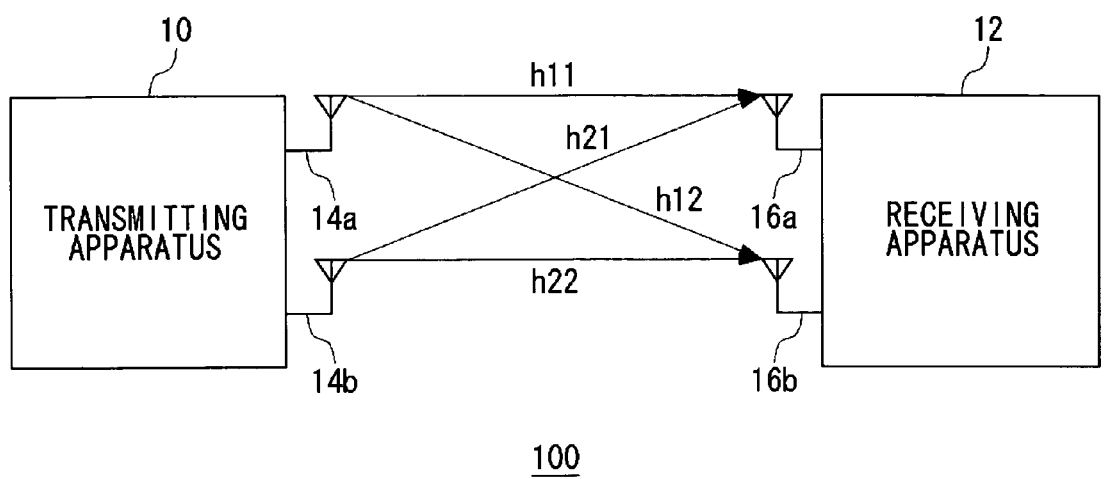
FIG. 3 illustrates a concept of a communication system according to the present embodiment.

FIG. 3 illustrates a concept of a communication system 100 according to the present embodiment. The communication system 100 includes a transmitting apparatus 10 and a receiving apparatus 12. The transmitting apparatus 10 includes a first transmitting antenna 14a and a second transmitting antenna 14b, which are generically called transmitting antennas 14, and the receiving apparatus 12 includes a first receiving antenna 16a and a second receiving antenna 16b, which are generically called receiving antennas 16.

The transmitting apparatus 10 transmits predetermined signals, whereas the first transmitting antenna 14a and the second transmitting antenna 14b transmit different signals. The receiving apparatus 12 receives the signals transmitted from the first transmitting antenna 14a and the second transmitting antenna 14b by the first receiving antenna 16a and the second receiving antenna 16b. The receiving apparatus 12 separates received signals by adaptive array signal processing and demodulates the signals transmitted from the first transmitting antenna 14a and the second transmitting antenna 14b independently. Here, if the channel characteristic between the first transmitting antenna 14a and the first receiving antenna 16a is denoted by $h_{11}$, that between the first transmitting antenna 14a and the second receiving antenna 16b by $h_{12}$, that between the second transmitting antenna 14b and the first receiving antenna 16a by $h_{21}$, and that between the second transmitting antenna 14b and the second receiving antenna 16b by $h_{22}$, then the receiving apparatus 12 operates in such a manner as to activate $h_{11}$ and $h_{22}$ only by an adaptive array signal processing and demodulate the signals transmitted from the first transmitting antenna 14a and the second transmitting antenna 14b independently.

Now, problems to be solved when a preamble signal of a legacy system, for example, the STS thereof is transmitted from each of the first transmitting antenna 14a and the second transmitting antenna 14b shown in FIG. 3 will be explained. If the signal transmitted from the first transmitting antenna 14a is $S_1(t)$, the signal transmitted from the second transmitting antenna 14b is $S_2(t)$, and the noise is $n_1(t)$ and $n_2(t)$, then $X_1(t)$, or the signal received by the first receiving antenna 16a, and $X_2(t)$, or the signal received by the second receiving antenna 16b, will be expressed respectively as:

$$X_1(t)=h_{11}S_1(t)+h_{21}S_2(t)+n_1(t)$$

$$X_2(t)=h_{12}S_1(t)+h_{22}S_2(t)+n_2(t) \quad (2)$$

The signal strength in 16 FFT of signals received by the first receiving antenna 16a is expressed as follows:

$$\begin{aligned}\sum |X_1(t)|^2 &= \sum X_1(t)X_1^*(t) \\ &= \sum \{h_{11}S_1(t)+h_{21}S_2(t)+n_1(t)\}\{h_{11}^*S_1^*(t)+ \\ &\quad h_{21}^*S_2^*(t)+n_1^*(t)\} \\ &= h_{11}h_{11}^*\sum S_1(t)S_1^*(t)+h_{21}h_{21}^*\sum S_2(t)S_2^*(t)+ \\ &\quad h_{11}h_{21}^*\sum S_1(t)S_2^*(t)+h_{11}^*h_{21}\sum S_1^*(t)S_2(t)+ \\ &\quad h_{11}\sum S_1(t)n_1^*(t)+h_{21}\sum S_2(t)n_1^*(t)+ \\ &\quad h_{11}^*\sum S_1^*(t)n_1(t)+h_{21}^*\sum S_2^*(t)n_1(t)+ \\ &\quad \sum n_1(t)n_1^*(t)\end{aligned} \quad (3)$$

Using the relations $\Sigma S_1^*(t)S_2(t)=Xc$, $\Sigma S^*_i(t)n_j(t)=0$ and $|n_j(t)|^2 \approx 0$, the strength is expressed by:

$$\begin{aligned}\sum |X_1(t)|^2 &= |h_{11}|^2+|h_{21}|^2+h_{11}h_{21}^*Xc^*+h_{11}^*h_{21}Xc \\ &= |h_{11}|^2+|h_{21}|^2+2\operatorname{Re}[h_{11}h_{21}^*Xc^*]\end{aligned} \quad (4)$$

When the transmitted signal $S_1(t)$ and $S_2(t)$ are equal to each other and in addition $h_{11}=−h_{21}$, the strength of received signals is zero, so that the AGC of the receiving apparatus 12 does not function accurately. Since Xc in the data interval becomes generally so small as can be regarded as zero, the received power in the data interval becomes $|h_{11}|^2+|h_{22}|^2$. Hence, the difference in received power between the data interval and the STS interval is $2\operatorname{Re}[h_{11}h_{21}^*Xc^*]$ as expressed by the third term on the right-hand side of Equation (4). This indicates that the AGC does not function normally if the Xc in the STS interval is large and consequently there is a large difference in power between the STS interval and the data interval. Therefore, an STS different from the STS of legacy system is required for the MIMO system and the cross-correlation value between them is desired to be low.

Next, explained is a problem caused when a preamble signal, such as STS, suitable for a MIMO system described above is added to a front portion of a packet format. If a packet signal in which the preamble signal suitable for the MIMO system is added is transmitted, the receiving apparatus 12 can receive said packet signal. On the other hand, a receiving apparatus in the legacy system (not shown) also receives said packet signal suitable for the MIMO system. However, the preamble signals at the legacy system which are stored in the receiving apparatus thereof differ from the preamble signal added to the packet signal. Thus, even if a correlation processing is carried out between them, correlation values will not be greater than a predetermined value. As a result, the receiving apparatus cannot detect the packet signal. If the receiving apparatus and the transmitting apparatus are integrally structured to form a communication apparatus, the aforementioned operation corresponds to the packet signal not being detected by the communication apparatus, so that the transmitting apparatus transmits signals. This means that the carrier sensing is not accurately performed in the communication apparatus, so that the signal collision is likely to occur.

Figure 4:
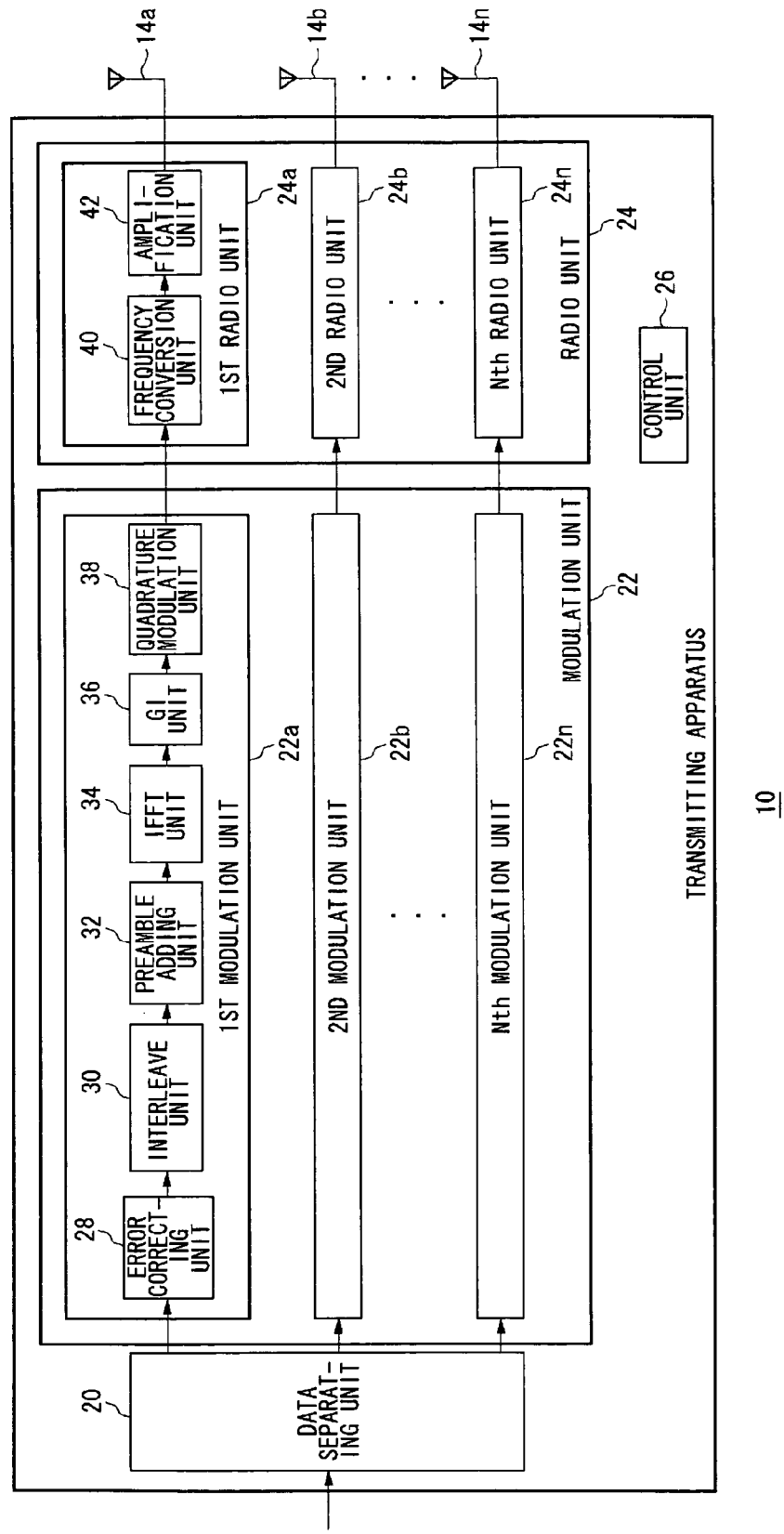
FIG. 4 illustrates a structure of the transmitting apparatus shown in FIG. 3.

FIG. 4 illustrates a structure of a transmitting apparatus 10. The transmitting apparatus 10 includes a data separating unit 20, a first modulation unit 22a, a second modulation unit 22b, . . . and an Nth modulation unit 22n, which are generically referred to as modulation units 22, a first radio unit 24a, a second radio unit 24b, . . . and an Nth radio unit 24n, which are generically referred to as radio units 24, a control unit 26, and a first transmitting antenna 14a, a second transmitting antenna 14b, . . . and an Nth transmitting antenna 14n, which are generically referred to as transmitting antennas 14. The first modulation unit 22a includes an error correcting unit 28, an interleave unit 30, a preamble adding unit 32, an IFFT unit 34, a GI unit 36 and a quadrature modulation unit 38. The first radio unit 24a includes a frequency conversion unit 40 and an amplification unit 42.

The data separating unit 20 separates data to be transmitted, based on the number of antennas. The error correcting unit 28 performs a coding for error correction on data. The coding to be employed here is a convolutional coding, and the coding rate is to be selected from prescribed values. The interleave unit 30 interleaves data after the convolutional coding. The preamble adding unit 32 adds a preamble signal to the front portion of a packet signal. Here, the preamble signals that the preamble adding unit 32 add are specified for a plurality of kinds. And any of such preamble signals of a plurality of kinds is selected based on an instruction from the control unit 26, details of which will be described later.

The IFFT unit 34 performs IFFT (Inverse Fast Fourier Transform) in units of FFT point, thereby converting a frequency-domain signal using a plurality of subcarriers into a signal in time domain. The GI unit 36 adds a guard interval to time-domain data. As illustrated in FIG. 2, the guard intervals to be added to the preamble signal and the data signal are different from each other. The quadrature modulation unit 38 carries out quadrature modulation. The frequency conversion unit 40 performs a frequency conversion by transforming a quadrature-modulated signal into a radio-frequency signal. The amplification unit 42 is a power amplifier for amplifying radio-frequency signals. Finally, signals are transmitted in parallel from a plurality of transmitting antennas 14. It is to be noted that in the present embodiment the transmitting antennas 14 are non-directional and the transmitting apparatus 10 does not perform adaptive array signal processing. The control unit 26 controls the timing and other functions of the transmitting apparatus 10, and selects a preamble signal which is to be added by the preamble adding unit 32.

In terms of hardware, the above-described structure can be realized by a CPU, a memory and other integrated circuits of an arbitrary computer. In terms of software, it is realized by memory-loaded programs which have a reserved management function or the like, but drawn and described herein are function blocks that are realized in cooperation with those. Thus, it is understood by those skilled in the art that these function blocks can be realized in a variety of forms such as by hardware only, software only or the combination thereof.

Figure 5:
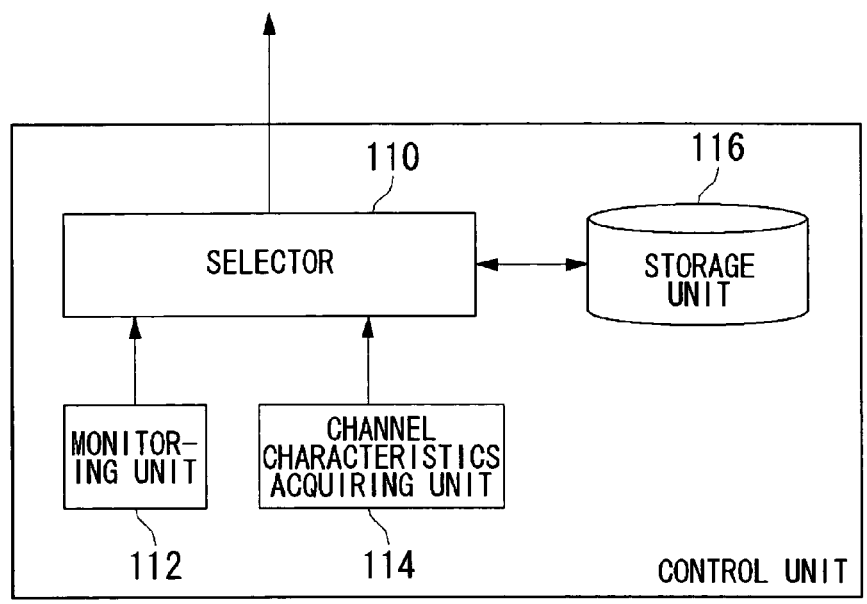
FIG. 5 illustrates a structure of the control unit shown in FIG. 4.

FIG. 5 illustrates a structure of a control unit 26. The control unit 26 includes a selector 110, a monitoring unit 112, a channel characteristics acquiring unit 114 and a storage unit 116.

The storage unit 116 stores preamble signals defined in a legacy system and those defined in a MIMO system. That is, the storage unit 116 stores the packet format in which a preamble signal in a MIMO system is placed, in a position subsequent to the preamble signal of legacy system. As described earlier, the legacy system and the MIMO system use multi-carrier signals. The MIMO system transmits signals in parallel from a plurality of antennas 14. The preamble signal defined in the MIMO system is specified in a plurality of kinds in accordance with the number of transmitting antennas 14 which are to transmit signals. The description will be given later of the preamble signal specified in the plurality of kinds. The preamble signal of MIMO system is also defined in such a manner as to contain STSs and LTSs similar to the preamble signal of legacy system shown in FIG. 2. Here, the signal pattern differs between STS and LTS.

The monitoring unit 112 monitors the presence of a communication apparatus which is not compatible with the MIMO system but is compatible with the legacy system. Here, assume that the transmitting apparatus 10 and a receiving apparatus, not shown, constitute integrally a communication apparatus, for example, a base station apparatus corresponding to the MIMO system. Among the received signals, the receiving apparatus searches for signals received from a communication apparatus of legacy system. That is, it is determined whether or not the packet format of a received packet format corresponds to the packet format of legacy system shown in FIG. 2. If the monitoring unit 112 has not detected any packet signal defined in the legacy system over a predetermined period of time, it is judged that the communication apparatus associated with the legacy system does not exist. If, on the other hand, the monitoring unit 112 has detected any packet signal defined in the legacy system over a predetermined period of time, it is judged that the communication apparatus associated with the legacy system exists.

The channel characteristics acquiring unit 114 derives the characteristics of a radio channel between the transmitting apparatus 10 and a receiving apparatus 12. The characteristics of a radio channel are measured by a predetermined method. One method is such that the characteristics of a radio channel are measured by the receiving apparatus 12 of FIG. 3. And another method is such that they are measured by a communication apparatus including the transmitting apparatus 10. The former corresponds to the characteristics of a radio channel from the transmitting apparatus 10 toward the receiving apparatus 12 whereas the latter corresponds to the characteristics of a radio channel from the receiving apparatus 12 toward the transmitting apparatus 10. In the former case, it is assumed that the communication apparatus including the receiving apparatus 12 conveys the measurement result to the communication apparatus including the transmitting apparatus 10. Here, it is assumed that the characteristics of a radio channel include received power, delay profile, delay spread, error rate and so forth.

Figure 6A:
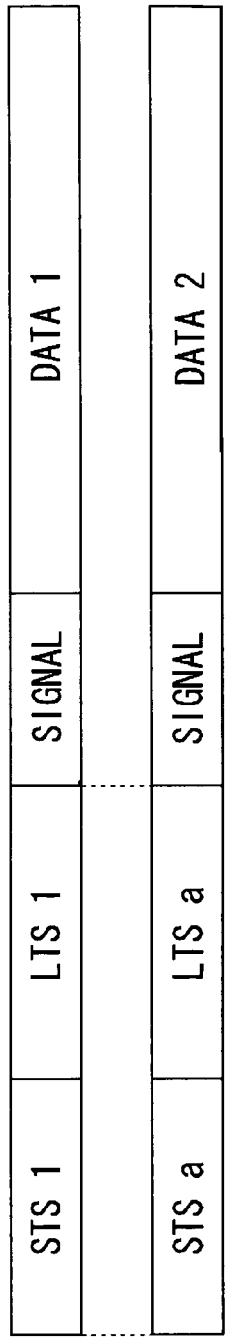
FIGS. 6A and 6B illustrate packet formats selected by the selector shown in FIG. 5.
Figure 6B:
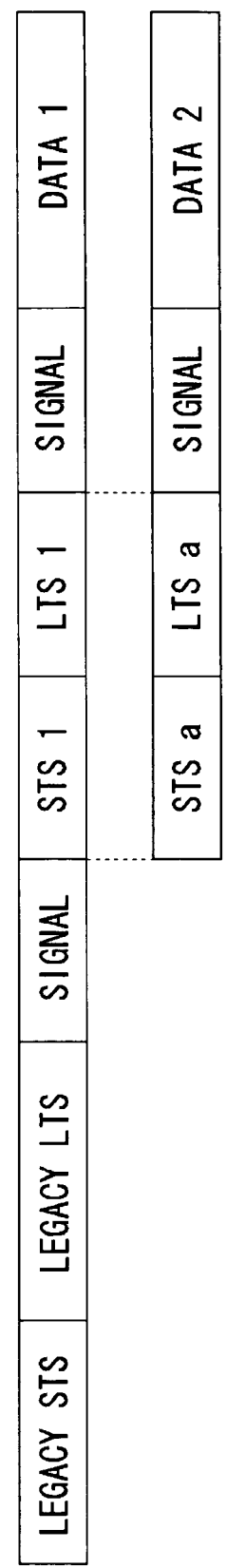

The selector 110 selects a packet format based on the monitoring result obtained by the monitoring unit 112. Here, the packet format is defined in two kinds. FIGS. 6A and 6B illustrate packet formats selected by the selector 110. FIG. 6A shows a packet format in which a preamble signal compatible with a MIMO system is placed in the front portion thereof (hereinafter this packet format will be referred to as "dedicated format"). Here, assume that signals are transmitted from the first transmitting antennas 14a and the second transmitting antennas 14b from among the transmitting antennas 14 and the packet format of a signal transmitted from the first transmitting antenna 14a is shown in the upper section of FIG. 6A and the packet format thereof transmitted from the second transmitting antenna 14b is shown in the lower section of FIG. 6A. "STS1" and "LTS1" are transmitted as preamble signals from the first transmitting antenna 14a, and "STSa" and "LTSa" are transmitted as preamble signals from the second transmitting antenna 14b. Here, "STS1" and "STSa" as well as "LTS1" and "LTSa" are signals different from each other, respectively, and the detail thereof will be described later.

FIG. 6B shows a packet format in which a preamble signal compatible with the legacy system is further placed before the preamble signal compatible with the MIMO system (hereinafter this packet format will be referred to as "mixed format"). Here, the preamble signals STS and LTS compatible with the legacy system will be denoted as "legacy STS" and "legacy LTS", respectively. The patterns of the legacy STS are as described earlier with reference to FIG. 2. A portion corresponding to the preamble signals of the MIMO system is the same as that shown in FIG. 6A. "Signal" is placed between the preamble signals compatible with the legacy system and those compatible with the MIMO system. The "signal" contains information indicating that the preamble signals compatible with the MIMO system are assigned. Thus, even if the communication apparatus of a legacy system receives this packet, it may discard this packet signal from the content of the "signal". The information indicating such the preamble signals are assigned may be the length of a packet signal. In other words, it suffices if whether a certain signal continues for a certain length of time or not can be decided. In the mixed format, the subcarrier numbers of portions corresponding to "legacy STS", "legacy LTS" and "signal" differ from those of subsequent ones.

Since the dedicated format has less redundant signal component, the packet utilization efficiency can be improved. On the other hand, the packet signal compatible with the legacy system is added in the mixed format, so that the mixed format is detected by a communication system compatible with the legacy system. If the monitoring unit 112 has not detected any communication apparatus compatible with the legacy system, the selector 110 selects the dedicated format. And if the monitoring unit 112 has detected the communication apparatus compatible with the legacy system, the selector 110 selects the mixed format.

That is, the selector 110 generates packets while selecting either the dedicated format or the mixed format based on a monitoring result obtained from the monitoring unit 112. Here, the dedicated format can be said to be a packet format defined in a manner such that part of the mixed format is extracted. The thus extracted part contains at least a part, to be used to estimate a channel, among the preamble signal in the MIMO system. Here, the part to be used to estimate a channel corresponds to "LTS1" and "LTSa" in FIGS. 6A and 6B.

Figure 7A:
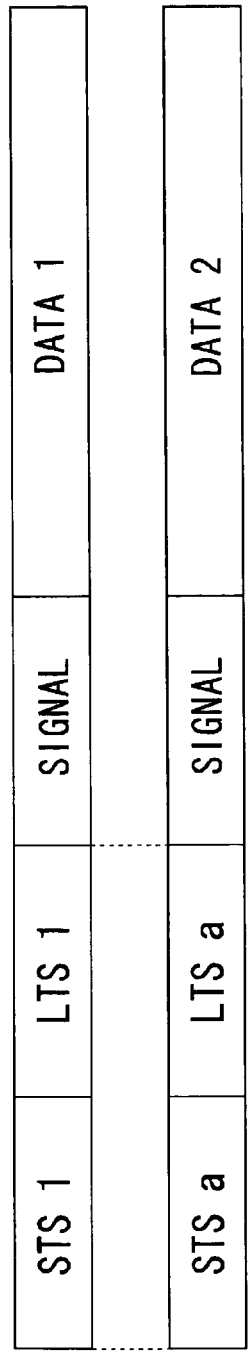
FIGS. 7A and 7B illustrate formats of LTS selected by the selector shown in FIG. 5.
Figure 7B:
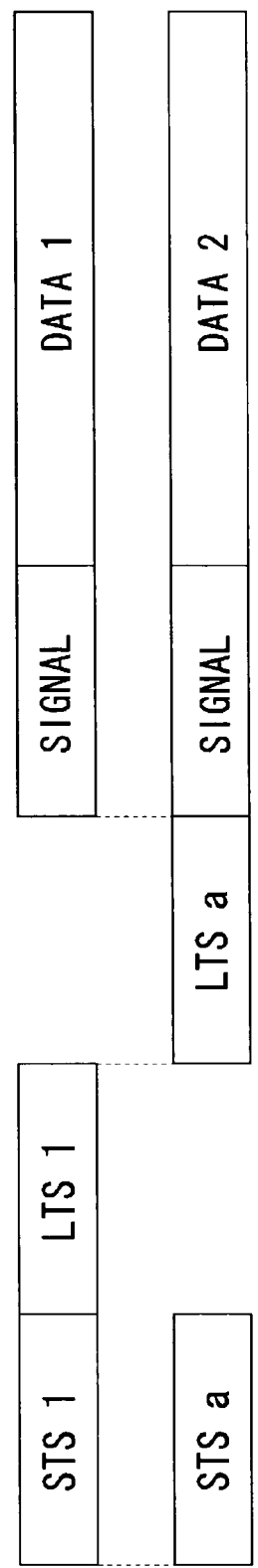

The selector 110 selects the allocation of LTS, based on the characteristics of a radio channel detected by the channel characteristics acquiring unit 114. FIGS. 7A and 7B illustrate the format of LTS selected by the selector 110. Though in FIGS. 7A and 7B the format is described using the dedicated format only, the format used may be the mixed format. In that case when the mixed format is used, the preamble signals of the MIMO system will be shown instead. FIG. 7A shows a case when LTSs are respectively transmitted at the same timing (hereinafter such a format will be referred to as "contiguous format"). "LTS1" is transmitted from the first transmitting antenna 14a and "LTSa" is transmitted from the second transmitting antenna 14b. FIG. 7B shows a case when LTSs are respectively transmitted from a plurality of antennas 14 at different timings (hereinafter such a format will be referred to as "separate format"). As shown in FIG. 7B, the timing at which "LTS1" is transmitted deviates from the timing at which "LTSa" is transmitted.

Since the contiguous format has less redundant signal component, the packet utilization efficiency can be improved. On the other hand, the separate format is such that "LTS1" and "LTSa" are transmitted at different timings and the intersignal interference is reduced. Thus, the estimation of channel characteristics as well as the estimation of response vectors and weight vectors by the receiving apparatus 12, described later, will be accurately done, so that the communication quality improves. If the characteristic of a radio channel acquired by the channel characteristics acquiring unit 114, for example, the error rate has not deteriorated more than a threshold value, then the selector 110 selects the contiguous format. And if the error rate has more deteriorated than the threshold value, the selector 110 selects the separate format.

FIG. 8 is a table showing a relationship, used when the selection is done at the selector 110, between the number of transmitting antennas 14 and the patterns of STSs transmitted by the transmitting antennas. Though the description concerning LTSs is omitted here, the selection will be done in the same manner as with STSs. The table shows the numbers of transmitting antennas 14 vertically. The table also shows horizontally the transmitting antennas 14 to be used and the STSs corresponding thereto in relation to the numbers of antennas 14. In other words, when the number of transmitting antennas 14 is "1", a legacy STS is transmitted from the first transmitting antenna 14a. If the number of transmitting antennas 14 becomes one when using the dedicated format, the selector 110 may transmit "STS1" defined in the MIMO system. As a result of this, the switching otherwise done to the preamble signal compatible with the legacy system can be skipped.

When the number of transmitting antennas 14 is "2", "STS1" is transmitted from the first transmitting antenna 14a and "STSa" is transmitted from the second transmitting antenna 14b. When the number of transmitting antennas 14 is "3", "STS1" is transmitted from the first transmitting antenna 14a, "STS2" is transmitted from the second transmitting antenna 14b and "STSb" is transmitted from the third transmitting antenna 14c. Here, in order to solve the aforementioned problem, "STS1", "STSa", "STS2" and "STSb" are defined in a manner such that the cross-correlation values thereof become small.

The transmitting apparatus further includes a function by which to notify the receiving apparatus 12 about the number of transmitting antennas 14 that are transmitting the signals, by the pattern difference between "STSa" transmitted from the second transmitting antenna 14b when the number of antennas 14 is "2" and "STSb" transmitted from the transmitting antenna 14c when the number of transmitting antennas 14 is "3". As a result, these STSs differ to the degree that "STSa" and "STSb" are identifiable from the signals received by the receiving apparatus 12. In other words, the value of cross-correlation between "STSa" and "STSb" is so defined as to be small.

The number of transmitting antennas 14 is determined by the control unit 26. The control unit 26 determines the number of transmitting antennas 14 in accordance with the characteristics of a radio channel acquired by the channel characteristics acquiring unit 114. That is, if the characteristics of a radio channel are found favorable, the number of transmitting antennas 14 is increased. The control unit 26 may determine the number of transmitting antennas 14 based on the information capacity to be transmitted. For instance, if the information capacity to be transmitted is large, the number of transmitting antenna 14 is increased.

Figure 9:
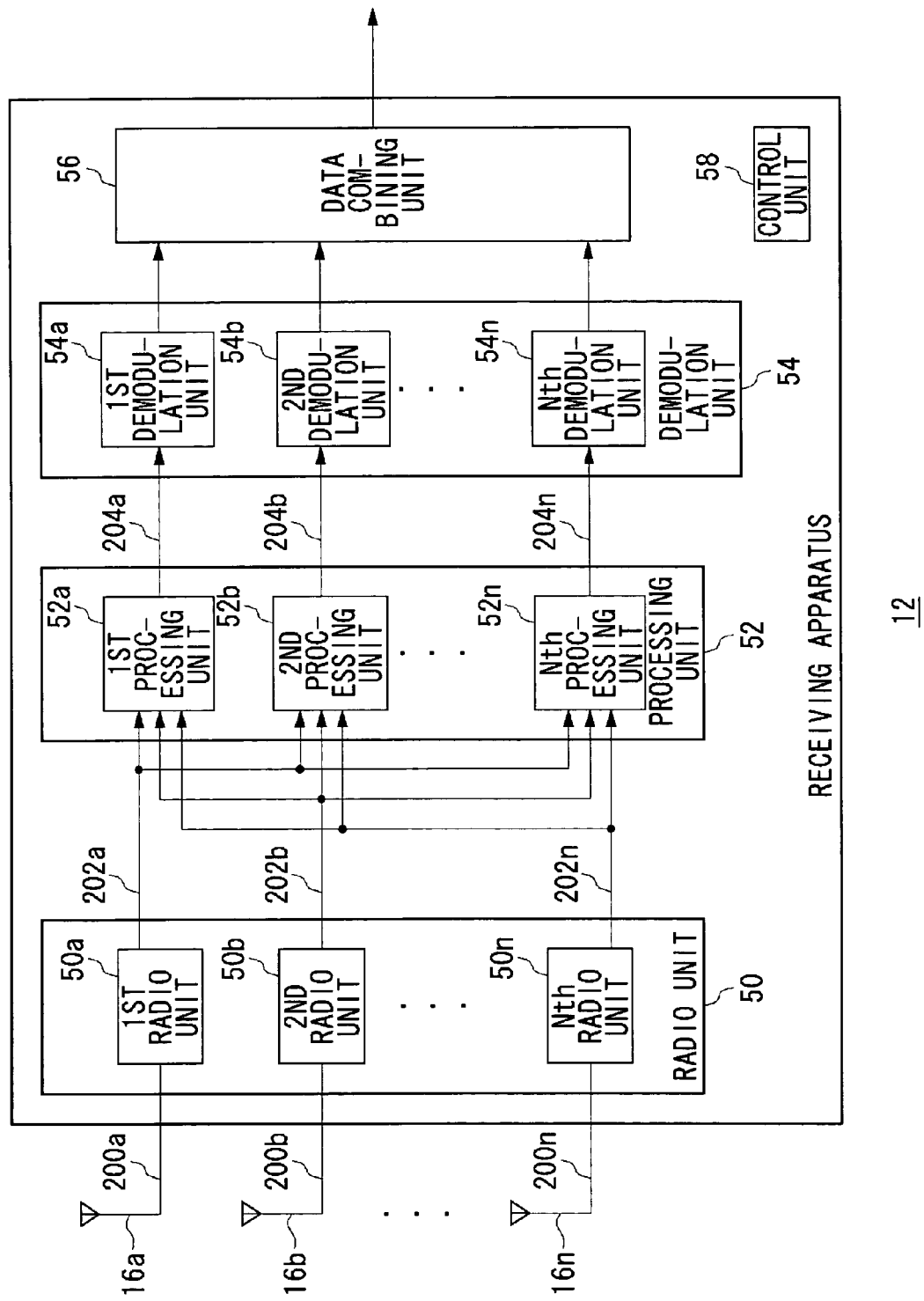
FIG. 9 illustrates a structure of the receiving apparatus shown in FIG. 3.

FIG. 9 illustrates a structure of a receiving apparatus 12. The receiving apparatus 12 includes a first receiving antenna 16a, a second receiving antenna 16b, ... and an Nth receiving antenna 16n, which are generically referred to as receiving antennas 16, a first radio unit 50a, a second radio unit 50b, ... and an Nth radio unit 50n, which are generically referred to as radio units 50, a first processing unit 52a, a second processing unit 52b, ... and an Nth processing unit 52n, which are generically referred to as processing units 52, a first demodulation unit 54a, a second demodulation unit 54b, ... and an Nth demodulation unit 54n, which are generically referred to as demodulation units 54, a data combining unit 56, and a control unit 58. Signals used include a first radio received signal 200a, a second radio received signal 200b, ... and an Nth radio received signal 200n, which are generically referred to as radio received signals 200, a first baseband received signal 202a, a second baseband received signal 202b, ... and an Nth baseband received signal 202n, which are generically referred to as baseband received signals 202, and a first composite signal 204a, a second composite signal 204b, ... and an Nth composite signal 204n, which are generically referred to as composite signals 204.

The receiving apparatus 12 receives packet signals from the transmitting apparatus 10 of FIG. 4 via the receiving antennas 16. The radio units 50 carry out frequency conversion processing between radio received signals 200 of radio frequency and baseband received signals 202 of baseband, amplification processing, A-D conversion processing and the like. It is assumed here that the radio frequency of the radio received signals 200 is in the 5 GHz band. The radio units 50 further perform correlation processing for timing detection. The processing units 52 perform adaptive array signal processing on the baseband received signals 202 and output composite signals 204 corresponding to a plurality of transmitted signals. The demodulation units 54 demodulate the composite signals 204. That is, the processing unit 52 estimates the transmission characteristics based on a part to be used to estimate a channel among the preamble signals of the received signal compatible with the MIMO system, namely, "LTS1" or the like shown in FIGS. 6A and 6B. The processing unit 52 processes the data contained in the packet signal, based on the estimated channel characteristics. The demodulation units 54 further perform the removal of guard intervals, FFT, deinterleave and decoding. The data combining unit 56 combines the signals outputted respectively from the demodulation units 54 in correspondence to the data separating unit 20 as shown in FIG. 4. The control unit 58 controls the timing and other functions of the receiving apparatus 12.

Figure 10:
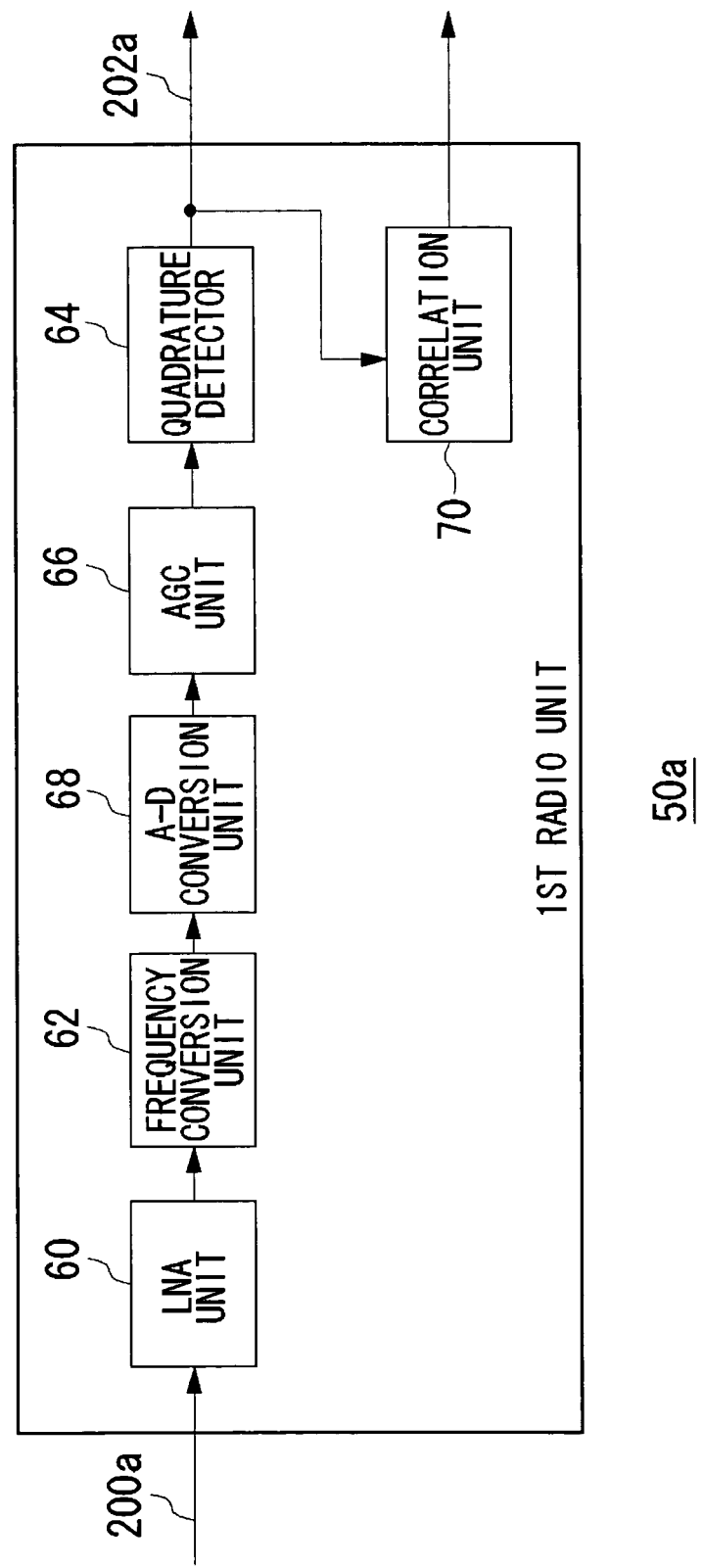
FIG. 10 illustrates a structure of the first radio unit shown in FIG. 9.

FIG. 10 illustrates a structure of a first radio unit 50a. The first radio unit 50a includes an LNA 60, a frequency conversion unit 62, a quadrature detector 64, an AGC unit 66, an A-D conversion unit 68 and a correlator 70.

The LNA 60 amplifies a first radio received signal 200a. The frequency conversion unit 62 carries out a frequency conversion between a radio frequency in the 5 GHz band and an intermediate frequency for a signal to be processed. The AGC unit 66 controls gain automatically so as to turn the amplitude of a signal into an amplitude within the dynamic range of the A-D conversion unit 68. It is to be noted that, in the initial setting of the AGC unit 66, the STS in a received signal is used and control is performed in a manner such that the strength of the STS approaches a prescribed value. The A-D conversion unit 68 converts an analog signal into a digital signal. The quadrature detector 64 performs a quadrature detection of an intermediate-frequency signal and generates a baseband digital signal so as to output it as a first baseband received signal 202a. The baseband signal, which is generally composed of in-phase components and quadrature components, shall be represented by two signal lines. For the sake of clarity in the figure, the baseband signal is presented here by a single signal line, and the same will be applied hereinafter.

In order to detect an STS from the first baseband received signal 202a, the correlator 70 performs correlation processing on a first baseband received signal 202a and an STS stored in advance and outputs a correlation value. In the MIMO system the STS is set for each of the transmitting antennas 14, so that the correlators 70 perform correlation processings respectively for a plurality of STSs and output a plurality of correlation values. The correlation values are inputted to the control unit 58 shown in FIG. 9 via signal lines not shown. The control unit 58 determines the start of receiving a packet signal based on the plurality of correlation values inputted from the plurality of correlators 70 and sends the decision to the processing units 52, the demodulation units 54 and others. Also, in order to demodulate a plurality of signals, the control unit 58 determines the assignment of processing units 52 and demodulation units 54 for the respective signals and sends the decision to the processing units 52 and the demodulation units 54.

Figure 11:
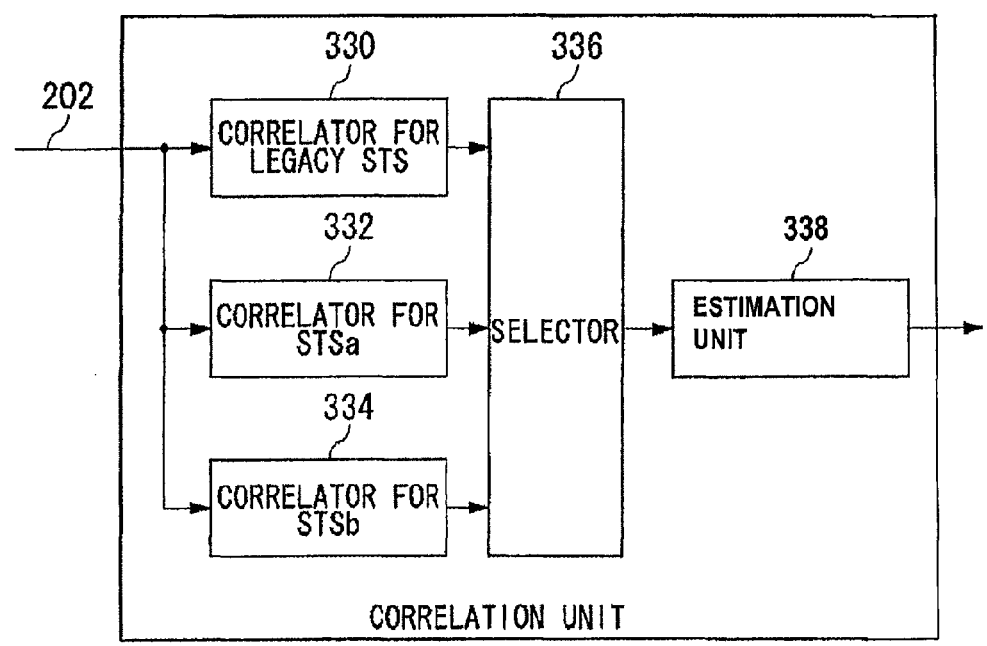
FIG. 11 illustrates a structure of the correlator shown in FIG. 10.

FIG. 11 illustrates a structure of a correlator 70. The correlator 70 includes a correlator for legacy STS 330, a correlator for STSa 332, a correlator for STSb 334 and a selector 336.

The correlator for STSa 332, which stores beforehand signal series where STSa has been converted to signal series in the time domain, calculates a value of correlation between the stored signal series and the received signal series (hereinafter referred to as "correlation value for 2 antennas"). The correlator for STSb 334, which stores beforehand signal series where STSb has been converted into signal series in the time domain, calculates a value of correlation between the stored signal series and the received signal series hereinafter referred to as "correlation value for 3 antennas").

The correlator for legacy STS 330 stores in advance the signal series where the aforementioned legacy STS has been converted into the time domain or where subcarrier signals for part of the legacy STS have been converted into the time domain. The correlator for legacy STS 330 calculates a value of correlation between the stored signal series and the received signal series (hereinafter referred to as "correlation value for 1 antenna"). The signal series stored in the correlator for legacy STS 330 may be those corresponding to the STS compatible with the MIMO system, for instance, STS1 shown in FIG. 8.

The selector 336 compares a correlation value for 2 antennas, a correlation value for 3 antennas and a correlation value for 1 antenna and selects a largest correlation value therefrom. An estimation unit 338, determines the number of transmitting antennas 14 transmitting data, based on the selected correlation value. That is, if the correlation value for 2 antennas is the largest, the number of transmitting antennas 14 will be determined to be "2". And if the correlation value for 3 antennas is the largest, the number of transmitting antennas 14 will be determined to be "3". And if the correlation value for 1 antenna is the largest, the number of transmitting antennas 14 will be determined to be "1".

Figure 12:
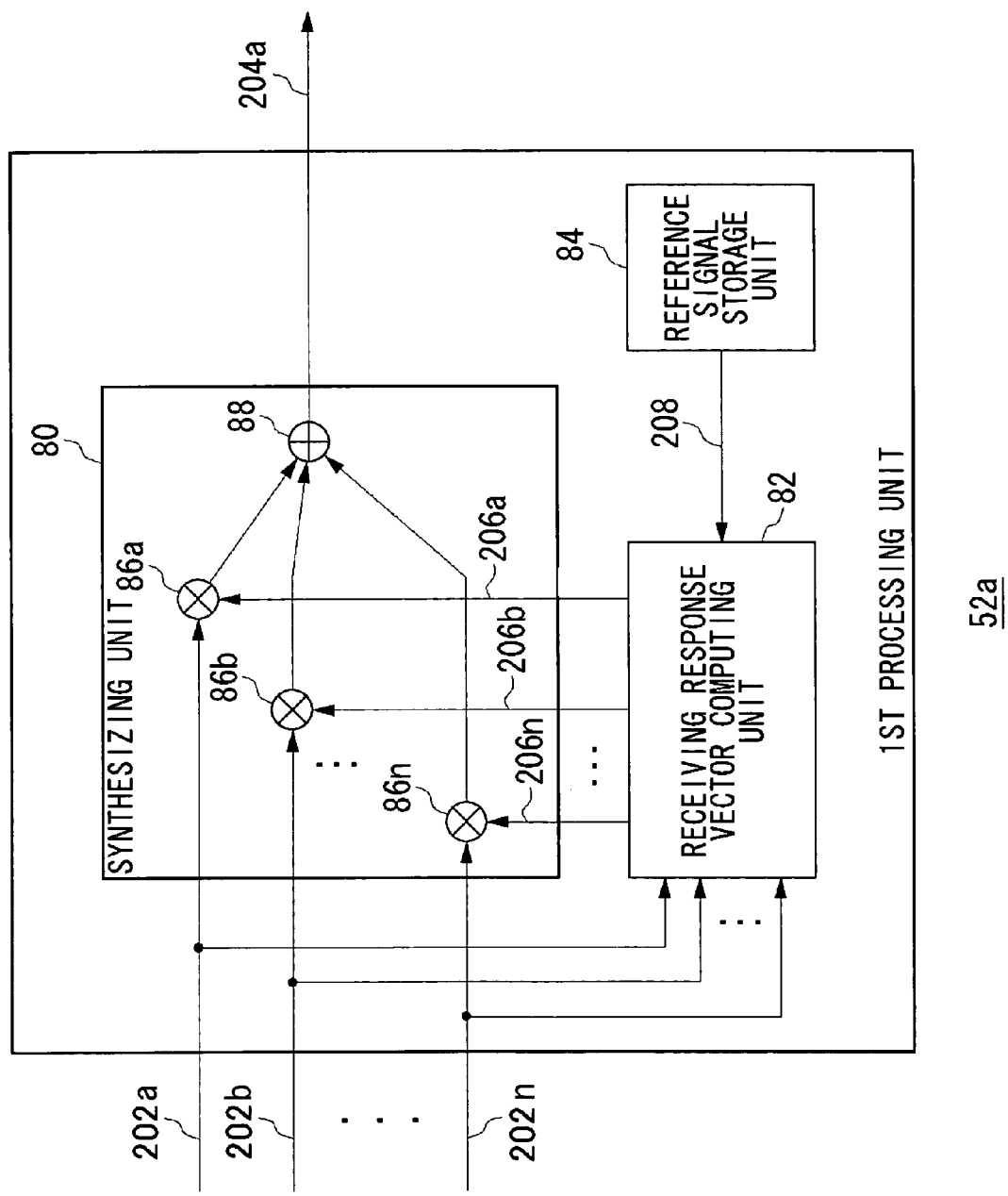
FIG. 12 illustrates a structure of the first processing unit shown in FIG. 9.

FIG. 12 illustrates a structure of a first processing unit 52a. The first processing unit 52a includes a synthesizing unit 80, a received response vector computing unit 82 and a reference signal storage unit 84. The synthesizing unit 80 includes a first multiplier 86a, a second multiplier 86b, . . . and an Nth multiplier 86n, which are generically referred to as multipliers 86, and an adder 88. Also, signals used include a first received weight signal 206a, a second received weight signal 206b, . . . and an Nth received weight signal 206n, which are generically referred to as received weight signals 206, and a reference signal 208.

The reference signal storage unit 84 stores LTSs and other signals. It is assumed herein that LTS is also selected in accordance with STS selected by the correlator for legacy STS 330.

The received response vector computing unit 82 computes received weight signals 206, as receiving response characteristics of received signals for transmitted signals, from baseband received signals 202 and reference signal 208. Although the method for computing the received weight signals 206 may be arbitrary, one example, as shown below, is based on a correlation processing. It is to be noted that the received weight signals 206 and the reference signal 208 are inputted not only from within the first processing unit 52a but also from the second processing unit 52b or the like via signal lines not shown. If the first baseband received signal 202a is denoted by $x_1(t)$, a second baseband received signal 202b by $x_2(t)$, the reference signal 208 corresponding to the first transmitting antenna 14a by $S_1(t)$ and the reference signal 208 corresponding to the second transmitting antenna 14b by $S_2(t)$, then $x_1(t)$ and $x_2(t)$ will be expressed by the following Equation (5):

$$x_1(t)=h_{11}S_1(t)+h_{21}S_2(t)$$

$$x_2(t)=h_{12}S_1(t)+h_{22}S_2(t) \qquad (5)$$

The noise is ignored here. A first correlation matrix $R_1$, with E as an ensemble average, is expressed by the following Equation (6):

$$R_1 = \begin{bmatrix} E[x_1 S_1^*] & E[x_1 S_2^*] \\ E[x_2 S_1^*] & E[x_2 S_2^*] \end{bmatrix} \qquad (6)$$

A second correlation matrix $R_2$ for computing the correlation among the reference signals 208 is given by the following Equation (7):

$$R_2 = \begin{bmatrix} E[S_1 S_1^*] & E[S_1 S_2^*] \\ E[S_2 S_1^*] & E[S_2 S_2^*] \end{bmatrix} \qquad (7)$$

Finally, the first correlation matrix $R_1$ is multiplied by the inverse matrix of the second correlation matrix $R_2$ so as to obtain a received response vector, which is expressed by the following Equation (8):

$$\begin{bmatrix} h_{11} & h_{21} \\ h_{12} & h_{22} \end{bmatrix} = R_1 R_2^{-1} \qquad (8)$$

The received weight signal 206 is derived from the received response vector. The received weight signals 206 may be derived using an adaptive algorithm such as the LMS.

The multipliers 86 weight the baseband received signals 202 with the received weight signals 206 respectively, and the adder 88 adds up the outputs of the multipliers 86 so as to output the composite signal 204.

Figure 13:
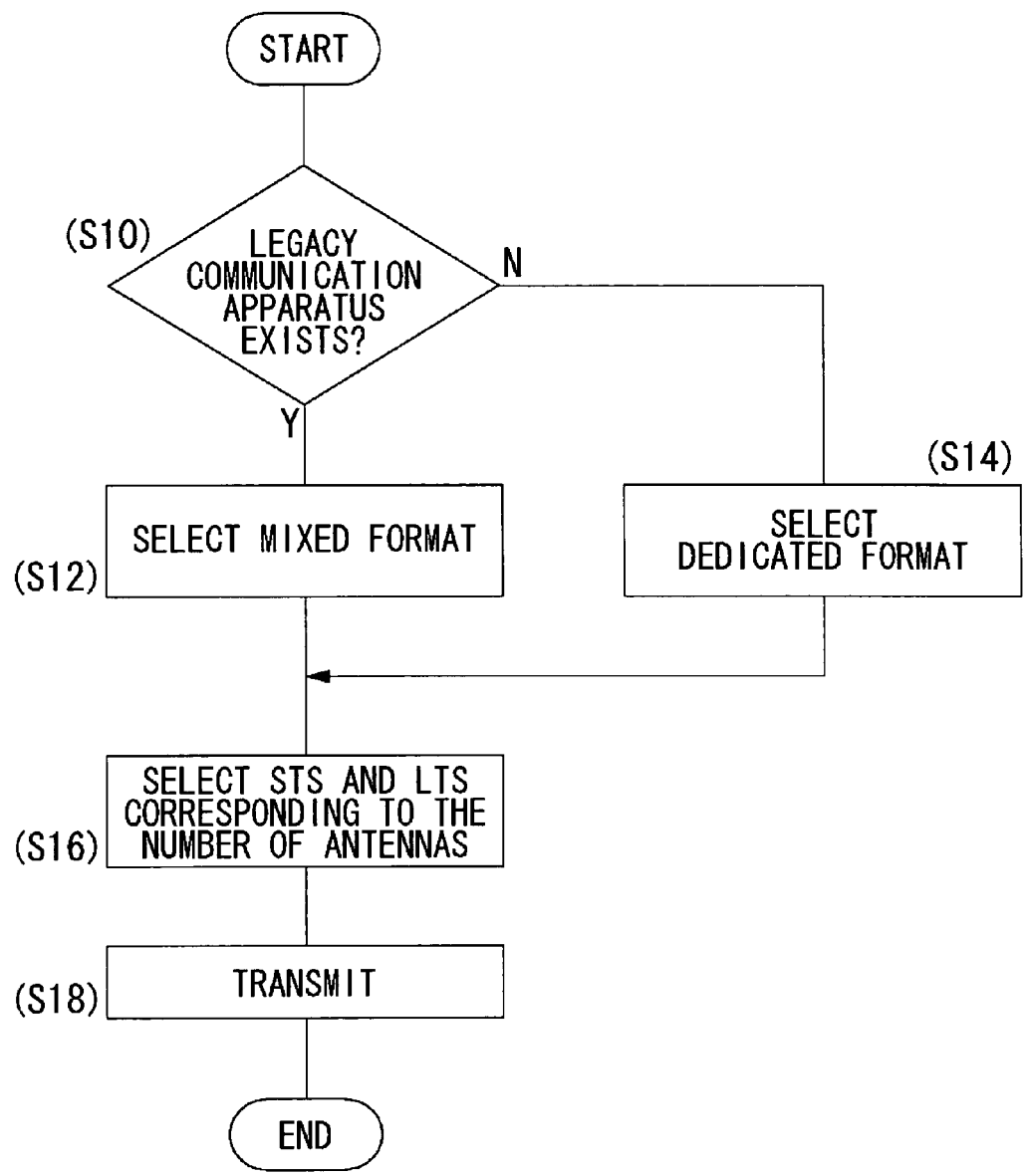
FIG. 13 is a flowchart showing a procedure for transmission processing in the transmitting apparatus shown in FIG. 3.

FIG. 13 is a flowchart showing a procedure for transmission processing in a transmitting apparatus 10. The monitoring unit 112 monitors whether there exists any communication apparatus compatible with the legacy system or not. If the communication apparatus compatible with a legacy system exits (Y of S10), the selector 110 selects the mixed format (S12). If, on the other hand, the communication apparatus compatible with a legacy system does not exist (N of S10), the selector 110 selects the dedicated format (S14). Furthermore, the selector 110 selects, from the storage unit 116, STS and LTS corresponding to the number of transmitting antennas 14 (S16) and assigns them within the selected format. And the transmitting apparatus 10 transmits the packet signals (S18).

Figure 14:
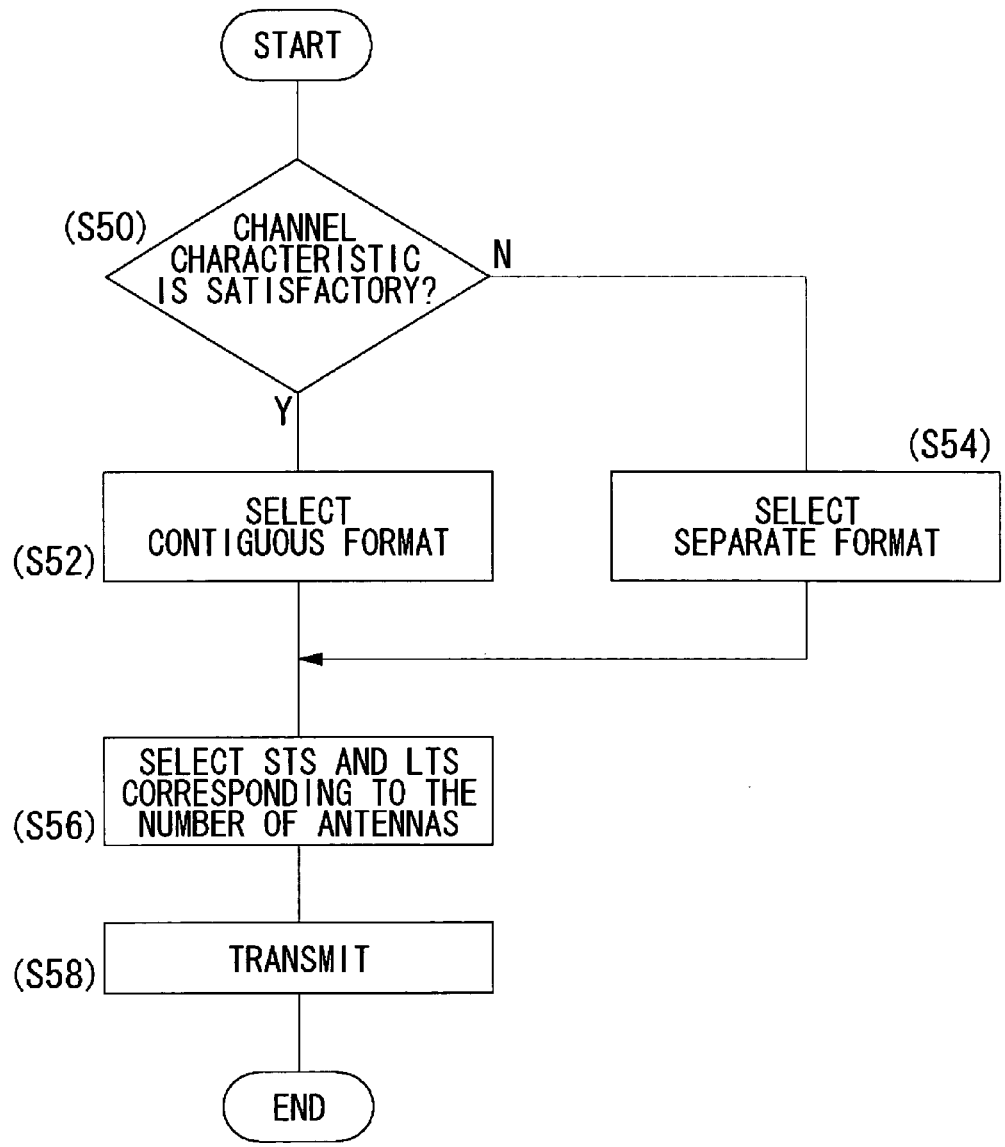
FIG. 14 is another flowchart showing a procedure for transmission processing in the transmitting apparatus shown in FIG. 3.

FIG. 14 is a flowchart showing another procedure for transmission processing in the transmitting apparatus 10. The channel characteristics acquiring unit 114 acquires the characteristics of a radio channel, for example, the error rate. If the characteristic of a radio channel is satisfactory (Y of S50), that is, if the error rate is smaller than a threshold value, then the selector 110 selects the contiguous format (S52). If, on the other hand, the characteristic of a radio channel is not satisfactory (N of S50), the selector 110 selects the separate format (S54). Furthermore, the selector 110 selects, from the storage unit 116, STS and LTS corresponding to the number of transmitting antennas 14 (S56) and assigns them within the selected format. And the transmitting apparatus 10 transmits the packet signals (S58).

Now, some modifications to the above-described embodiments will be explained here. A transmitting apparatus according to a modification is the same type as the transmitting apparatus 10 shown in FIG. 4 and is of the same type as the receiving apparatus 12 shown in FIG. 9. Thus the repeated description of the structure for a transmitting apparatus will be omitted here. FIGS. 15A to 15C illustrate structures of packet format according to a modification of the present invention. A structure shown in FIG. 15A is a modification of that shown in FIG. 6B, and is a modification of the mixed format. Parts placed on and after "STS1" and "STSa" are the same as those of FIG. 6B. In FIG. 15B, however, "legacy STS", "legacy LTS" and "signal" are assigned for the second transmitting antenna 14b, too. At the same time, for example, CCD (Cyclic Delay Diversity) is applied to "legacy STS" and the like assigned for the second antenna 14b.

That is, the legacy STS assigned for the second transmitting antenna 14b is such that the timing shift is effected to the legacy STS assigned for the first transmitting antenna 14a. Here, as shown in FIG. 15A, "legacy STS" to which CCD is applied is denoted by "legacy STS+CCD". The same is true when "legacy STS" and the like is assigned for the third transmitting antenna 14c. As described above, "legacy STS"

and "legacy LTS" contained in a legacy format is defined in a manner such that they have mutual relations among a plurality of antennas 14, respectively. Here, the "relation" may be CDD as mentioned above. Furthermore, "STS1", "STSa" and the like are defined in such a manner as to be associated respectively to the plurality of antennas 14.

FIG. 15B shows a dedicated format compatible with the mixed format of FIG. 15A. The dedicated format of FIG. 15B is so defined that part of the mixed format of FIG. 15A is extracted. Here, the "part" corresponds to "STS1", "STSa", "LTS1", "LTSa", "signal", "data 1" and "data 2". That is, the preamble signal and the signal corresponding to the legacy system are omitted. The format of FIG. 15B has the same structure as that of FIG. 6A. FIG. 15C shows another dedicated format compatible with the mixed format of FIG. 15A, and this dedicated format of FIG. 15C serves as a modification to the format of FIG. 15A. The dedicated format of FIG. 15C is defined by extracting another part, among the mixed formats of FIG. 15A, which differs from the part shown in FIG. 15B.

Here, the "part" corresponds to "legacy STS", "legacy STS+CDD", "LTS1", "LTSa", "signal", "data 1" and "data 2". That is, "legacy LTS", "legacy LTS+CDD", "signal", "signal+CDD", "STS1", "STSa" are omitted. It is assumed here that whether the packet format shown in FIG. 15B or that shown in FIG. 15C is used is recognized beforehand as a dedicated format in the receiving side.

To specify whether the packet signal to be received is the mixed format or dedicated format, the correlation unit 70 shown in FIG. 11 may carry out correlation processing. In so doing, the correlator 70 stores beforehand the relation between the pattern of signals contained in the mixed format and the pattern of signals contained in the dedicated format. For example, if the mixed format is defined as in FIG. 15A and the dedicated format is defined as in FIG. 15B, then the correlator 70 will store "legacy STS" as the pattern of signals contained in the mixed format and "STS1" and the like as the pattern of signals contained in the dedicated format. In other words, the aforementioned "relation" corresponds to a pattern of signals with which the respective format differences can be distinguished.

The correlator 70 performs a correlation processing of measuring correlation between the received packet signal and "legacy STS" and performs another correlation processing, in parallel thereto, of measuring correlation between the received packet signal and "legacy STS1". If the former correlation value is larger than the latter correlation value, the correlator 70 specifies the received packet signal as being a mixed format. And if the latter correlation value is larger than the former correlation value, the correlator 70 specifies the received packet signal as being a dedicated format. The processing unit 52, the demodulation unit 54 and so forth shown in FIG. 9 will perform processings according to the packet format specified by the correlator 70.

Another modification will be described hereunder. In the embodiments and modifications described so far, the packet formats made to correspond respectively to a plurality of transmitting antennas 14 have been described. As another modification, a description will be given of packet formats made to correspond respective to a plurality of series. The transmitting apparatus allocates the preamble signal compatible with the MIMO system to a plurality of series and allocates the data to a plurality of series. On the other hand, when defining the mixed format, the transmitting apparatus allocates the preamble signal compatible with the legacy system to at least one of a plurality of series. By multiplying the preamble compatible with the MIMO system and, the data by a steering matrix, the transmitting apparatus increases the number of series to which the preamble signal or data has been allocated, up to the number of transmitting antennas 14. When generating the packet signals of the mixed format, the transmitting apparatus performs CDD on the preamble signal compatible with the legacy system. Hereinafter, the packet signal of a plurality of series into which the steering matrix is multiplied or CDD is executed will also be called the "packet signal of a plurality of series"

The aforementioned steering matrix, which executes time shifting for each series, contains components with which to execute CDD. A shift amount in CDD differs for each packet signal of a plurality of series. According to the processings described above, the transmitting apparatus modifies the packet signal of a plurality of series and transmits from a plurality of antennas 14 the thus modified packet of a plurality of series.

Figure 16:
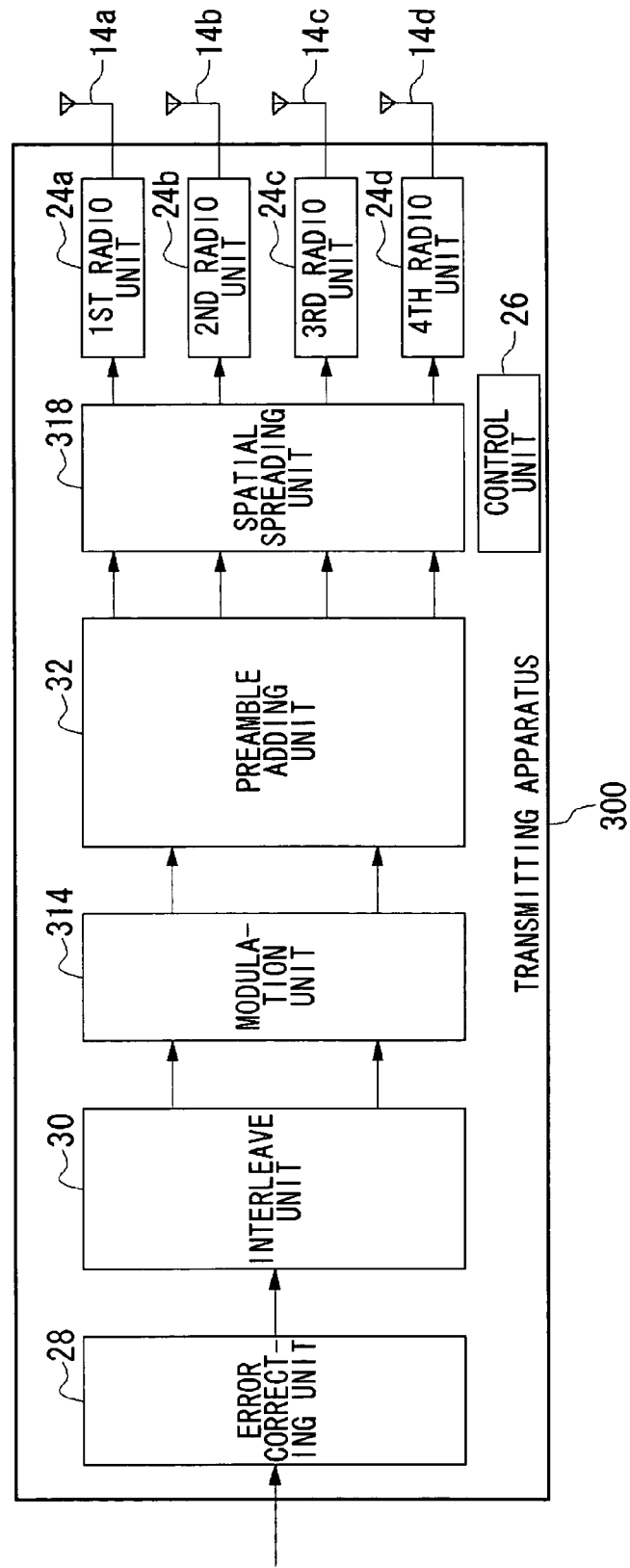
FIG. 16 illustrates a structure of a transmitting apparatus according to another modification of the present invention.

FIG. 16 illustrates a structure of a transmitting apparatus 300 according to another modification of the present invention. The transmitting apparatus 300 includes an error correcting unit 28, an interleave unit 30, a modulation unit 314, a preamble adding unit 32, a spatial spreading unit 318, a first radio unit 24a, a second radio unit 24b, a third radio unit 24c and a fourth radio unit 24d, which are generically referred to as radio units 24, a first transmitting antenna 14a, a second transmitting antenna 14b, a third transmitting antenna 14c and a fourth transmitting antenna 14d, which are generically referred to as transmitting antennas 14 and a control unit 26.

The error correcting unit 28 carries out coding for error correction. Here, the convolutional coding is carried out and the coding rate thereof is selected from among predefined values. The interleave unit 30 interleaves data on which the convolutional coding has been performed. The interleave unit 30 separates data into a plurality of series before outputting the data. Here, suppose that the data are separated into two series. The data of two series are mutually independent from each other.

The modulation unit 314 modulates the data of two series, respectively. The preamble adding unit 32 adds a preamble to the modulated data. A packet signal of a plurality of series corresponds to either the legacy format or the dedicated format in accordance with the preamble signal added by the preamble adding unit 32. Here, the packet format to which the preamble signal is added corresponds to that shown in FIGS. 6A and 6B or FIG. 15A to 15C. It is assumed that at this stage the CDD is not yet applied.

The spatial spreading unit 318 multiplies, by a steering matrix each, the preamble signal and the data corresponding to the MIMO system so as to generate preamble signals and data whose count has been increased to correspond to the number of transmitting antennas 14. The spatial spreading unit 318 extends the degree of inputted preamble signal and data up to the number of a plurality of series. The number of inputted preamble signal and data is "2" and is represented here by "Nin". Hence, the inputted preamble signal and data is expressed by a vector "Nin×1". The number of a plurality of transmitting antennas 14 is "4" and is represented here by "Nout". The spatial spreading unit 318 extends the degree of inputted preamble and data from Nin to Nout. That is, the vector "Nin×1" is extended to a vector "Nout×1". In so doing, "0's" are inserted to components from (Nin+1)th row to Nout-th row.

A steering matrix S is expressed by the following Equation (9).

$$S(l)=C(l)W \quad (9)$$

The steering matrix is a matrix of "Nout×Nout". W is an orthogonal matrix. One example of the orthogonal matrices is Walsh matrix. Here, "l" indicates the subcarrier number, and the multiplication by the steering matrix is carried out for each subcarrier. C is expressed by the following Equation (10) and is used for CDD.

$$C(l)=\text{diag}(1,\exp(-j2\pi l\delta/N\text{out}),\ldots,\exp(-j2\pi l\delta(N\text{out}-1)/N\text{out})) \quad (10)$$

where δ indicates a shift amount. That is, the spatial spreading unit 318 performs cyclic time shift on each series by a shift amount corresponding to each of a plurality of increased series. The shift amount is set to a value that differs for each series. The spatial spreading unit 318 performs CDD on the preamble signal and signal compatible with the legacy system. The CDD is performed while the shift amount is varied for each of the plurality of transmitting antennas 14.

For example, performing CDD on "legacy STS" generates "legacy STS", "legacy STS+CDD1", "legacy STS+CDD2" and "legacy STS+CDD3" are generated. Assume here that the shift amounts differ from one another among "CDD1", "CDD2" and "CDD3". In this manner, the preamble signal compatible with the legacy system is defined in a manner that the preamble signals have relations differing from one another among a plurality of series, respectively. As a result of the above-described processing, the spatial spreading unit 318 modifies a burst signal of a plurality of series.

The number of radio units 24 provided is identical to the number of transmitting antennas 14. Each of the radio units 24 transmits the modified packet signal of a plurality of series. In so doing, the radio units 24 transmit them while associating the modified packet signal of a plurality of series to the number of transmitting antennas. The radio units may transmit the packet signal from only some of the plurality of antennas 14.

FIGS. 17A to 17C illustrate structures of packet format in signals transmitted from a transmitting apparatus 300. Similar to FIG. 15A, a structure shown in FIG. 17A corresponds to a mixed format. CDD is performed on the "legacy STS", "legacy LTS" and "signal" which are preamble signals compatible with the legacy system, based on such a specified shift amount as the aforementioned "CDD1", "CDD2" or "CDD3". "STS1'" to "STS4'" correspond to signals which have been modified or deformed from "STS1", "STSa" and the like of FIG. 6B. In other words, "STS1'" to "STS4'" correspond to signals obtained by multiplying "STS1", "STSa" and the like by the steering matrix. The same is true for "LTS1'", "signal 1'", "data 1'" and the like.

FIG. 17B shows a dedicated format compatible with the mixed format of FIG. 17A. The dedicated format of FIG. 17B is so defined that part of the mixed format of FIG. 17A is extracted. Here, the "part" is defined in the same manner as with FIG. 15B. That is, the preamble signal corresponding to the legacy system is omitted. FIG. 17C shows another dedicated format compatible with the mixed format of FIG. 17A, and this dedicated format of FIG. 17C serves as a modification to the format of FIG. 17B. The dedicated format of FIG. 17C is defined by extracting another part, among the mixed formats of FIG. 17A, which differs from the part shown in FIG. 17B.

According to the present embodiment, the preamble signal in the legacy system is added to the front portion of a packet signal, so that the packet signal can be received by a communication apparatus compatible with the legacy system. The compatibility with the legacy system can be retained. The presence of packet signal can be made known to the communication apparatus of a legacy system. Since the transmission of signals by the communication apparatus of a legacy system is prevented, the probability of signal collision can be lowered. Since the presence or absence of the preamble signal of the legacy system is switched, the improvement in the compatibility with the legacy system and the packet utilization efficiency can be selected. The switching between the presence and the absence of a preamble signal of the legacy system is done based on whether any legacy system exits or not, thereby giving no adverse effect on other communication apparatus.

Furthermore, the pattern of preamble signal is changed in accordance with the number of antennas, so that the communication quality can be improved. Even when the number of antennas becomes one, the preamble signal corresponding to a single one of a plurality of antennas is used, thus eliminating the trouble of switching to the legacy system. A signal is inserted after the preamble signal of a legacy system. Thus, the content of such a subsequent signal can be conveyed to a communication apparatus of the legacy system. The structure of preamble signals to be transmitted from a plurality of antennas is changed, so that selection can be made as to the transmission quality of signals and the packet utilization efficiency. The structure of preamble signals to be transmitted from a plurality of antennas is varied based on the quality of a radio channel, so that the structure of a preamble suitable for the radio channel can be selected.

Furthermore, the dedicated format is so defined that part of the mixed format is extracted, so that a plurality of kinds of dedicated formats can be defined by changing the part to be extracted. Even if the number of series such as data is smaller than the number of antennas, the multiplication by an orthogonal matrix and the cyclic time shift processing are performed, so that the number of series such as data can be increased up to the number of transmitting antennas. The same processing as with the data series is performed on LTS compatible with the MIMO system, so that LTS compatible with the MIMO system can be used when a communication-targeted radio apparatus receives the data. From a received packet signal the packet format for said received packet is automatically specified, so that a sequence with which to notify the kind of a packet format can be omitted. Since the sequence for notifying the kind of a packet format can be omitted, the transmission efficiency can be improved.

The present invention has been described based on the embodiments which are only exemplary. It is understood by those skilled in the art that there exist still other various modifications to the combination of each component and process described above and that such modifications are encompassed by the scope of the present invention.

In the above embodiments, the wireless LAN that conforms to the IEEE802.11a standard is used as an example of the legacy system, but is not limited thereto and other communication systems may also be used. Though in the above embodiments the communication system 100 is illustrated as a MIMO system, but it is not limited thereto and other communication systems may be used. The multi-carrier signal may not be transmitted. The present embodiments can be applied to various types of communication systems 100. That is, it is preferable that the legacy system and the communication system 100 have some sort of compatibility such as the identical radio frequency.

In the present embodiments, as illustrated in FIGS. 15B and 15C and FIGS. 17B and 17C, the dedicated format is so defined that part of the mixed format is extracted. That is, the dedicated format is defined as a format wherein part of the mixed format is extracted. The dedicated format is defined in a manner such that at least one component such as "STS1" in FIG. 15B or "LTS1" in FIG. 15C is extracted, as it is, from among a plurality of components contained in the mixed format when the part is extracted. That is, only one of two modes is possible where one mode is such that a predetermined component is contained in the dedicated format as it is and the other mode is such that no such a predetermined component is contained in the dedicated format. However, the modes available are not limited thereto, and the dedicated format may be defined in a manner that part of the predetermined component is extracted.

More specifically, a part equivalent to the latter half in "LTS1" or the like may be extracted as the dedicated format. If "STS1" is formed in such a manner that a plurality of signals each having a predetermined period of cycle are connected to one another, the dedicated format may be defined in a manner that only a predetermined number of signals are extracted from among the signals each having a predetermined period of cycle. If "STS1" is formed by coupling together five signals each having a predetermined cycle, two signals in the rear side may be extracted as the dedicated format. The signals each having a predetermined cycle may have different patterns. The modification such as this described above is applicable also to "LTS1" and the like. According to this modification, the dedicated format can be defined multifariously. Also, the preamble's cycle contained in the dedicated format can be adjusted in detail. That is, it is preferable that preamble signals in which the receiving processing can be done be contained in the dedicated format.

Although the present invention has been described by way of exemplary embodiments and modifications, it should be understood that many other changes and substitutions may further be made by those skilled in the art without departing from the scope of the present invention which is defined by the appended claims.

What is claimed is:

1. A transmitting apparatus, comprising:
a generation unit which, capable of generating a first packet signal having a first packet format and a second packet signal having a second packet format, selectively generates one of the first and second packet signals; and
a transmitter which transmits the one of the first and second packet signals generated by said generation unit, wherein
the first packet format includes (1) a Legacy LTS (Long Training Sequence) used in a first wireless communication system and (2) a MIMO (Multiple Input Multiple Output) LTS used in a second wireless system different from the first wireless system and assigned subsequent to the Legacy LTS,
the second packet format is different from the first packet format, but includes a part of the first packet format except for the Legacy LTS, and
a Legacy STS (Short Training Sequence) and a MIMO STS are at the heads of the first and second packet formats, respectively, the Legacy STS and the MIMO STS being different from each other in a signal patterns and providing target apparatuses with AGC (Automatic Gain Control) estimation.

2. A transmitting apparatus according to claim 1, wherein the part of the first packet format included in the second packet format contains at least part of the MIMO LTS, which is to be used to estimate a channel.

3. A transmitting apparatus according to claim 2, wherein The Legacy LTS is defined in such a manner as to have mutual relations among a plurality of antennas, and
the MIMO LTS is defined in such a manner as to be associated to the plurality of antennas.

4. A transmitting apparatus according to claim 2, wherein The Legacy LTS is defined in such a manner as to have mutual relations among a plurality of series, and
The MIMO LTS is defined in such a manner as to be associated to the plurality of series.

5. A transmitting apparatus according to claim 1, wherein the first wireless communication system and the second wireless communication system use multi-carrier signals.

6. A transmitting apparatus according to claim 5, wherein the Legacy LTS is defined in such a manner as to have mutual relations among a plurality of antennas, and
the MIMO LTS is defined in such a manner as to be associated to the plurality of antennas.

7. A transmitting apparatus according to claim 5, wherein the Legacy LTS is defined in such a manner as to have mutual relations among a plurality of series, and
the MIMO LTS is defined in such a manner as to be associated to the plurality of series.

8. A transmitting apparatus according to claim 1, wherein The Legacy LTS is defined in such a manner as to have mutual relations among a plurality of antennas, and
The MIMO LTS is defined in such a manner as to be associated to the plurality of antennas.

9. A transmitting apparatus according to claim 1, wherein the Legacy LTS is defined in such a manner as to have mutual relations among a plurality of series, and
the MIMO LTS is defined in such a manner as to be associated to the plurality of series.

10. A transmitting apparatus according to claim 1, further comprising a monitoring unit which monitors the presence of a communication apparatus which is not compatible with the second wireless communication system and is compatible with the first wireless communication system,
wherein said generation unit generates the one of the first and second packet signals while selecting either the first packet format or the second packet format based on a monitoring result obtained from said monitoring unit.

11. A transmitting comprising:
generating at least one or the other of a packet signal having a first packet format and a packet signal having a second packet format, selectively; and
transmitting the packet signal, wherein
the first packet format includes (1) a Legacy LTS (Long Training Sequence) used in a first wireless communication system and (2) a MIMO (Multiple Input Multiple Output) LTS used in a second wireless system different from the first wireless system and assigned subsequent to the first known signal,
the second packet format is different from the first packet format, but includes a part of the first packet format except for the Legacy LTS, and
a Legacy STS (Short Training Sequence) and a MIMO STS are at the heads of the first and second packet formats, respectively, the Legacy STS and the MIMO STS being different from each other in a signal patterns and providing target apparatuses with AGC (Automatic Gain Control) estimation.

12. A transmitting apparatus, comprising:
a generation unit which, configured for generating at least one or the other of a packet signal having a first packet format and a packet signal having a second packet format, selectively generates one of the first and second packet signals; and
a transmitter which transmits the packet signal generated by said generation unit, wherein
the first packet format includes (1) a Legacy LTS (Long Training Sequence) used in a first wireless communication system and (2) a MIMO (Multiple Input Multiple Output) LTS used in a second wireless system different from the first wireless system and assigned subsequent to the first known signal,
the second packet format is different from the first packet format, but includes a part of the first packet format except for the Legacy LTS, and
a Legacy STS (Short Training Sequence) and a MIMO STS are at the heads of the first and second packet formats, respectively, the Legacy STS and the MIMO STS being different from each other in a signal patterns and providing target apparatuses with AGC (Automatic Gain Control) estimation.

13. A transmitting apparatus, comprising:
a generation unit which, capable of generating a first packet signal having a first packet format and a packet signal having a second packet format, selectively generates one of the first and second packet signals; and
a transmitter which transmits the packet signal generated by said generation unit, wherein
the first packet format includes (1) a Legacy LTS (Long Training Sequence) used in a first wireless communication system and (2) a MIMO (Multiple Input Multiple Output) STS used in a second wireless system different from the first wireless system and assigned subsequent to the Legacy LTS, and (3) a MIMO LTS used in the second wireless system to provide the target apparatus with channel estimation and assigned subsequent to the MIMO STS,
the second packet format is different from the first packet format, but includes a part of the first packet format except for the Legacy LTS, and
a Legacy STS (Short Training Sequence) is at the head of the first packet format, the Legacy STS being different from the MIMO STS in signal patterns and providing target apparatuses with AGC (Automatic Gain Control) estimation.

14. A transmitting apparatus, comprising:
a generation unit which, capable of generating a first packet signal having a first packet format and a second packet signal having a second packet format, selectively generates one of the first and second packet signals; and
a transmitter which transmits the one of the first and second packet signal generated by said generation unit, wherein
the first packet format includes (1) a Legacy LTS (Long Training Sequence) used in a first wireless communication system and (2) a MIMO (Multiple Input Multiple Output) LTS used in a second wireless system different from the first wireless system and assigned subsequent to the Legacy LTS,
the second packet format is different from the first packet format, but includes a part of the first packet format except for the Legacy LTS, and
a Legacy STS (Short Training Sequence) and a MIMO STS are at the heads of the first and second packet formats, respectively, the Legacy STS and the MIMO STS being different from each other in a signal patterns and providing target apparatuses with AGC (Automatic Gain Control estimation.

\* \* \* \* \*